(12) United States Patent
Chen

(10) Patent No.: US 11,944,090 B2
(45) Date of Patent: Apr. 2, 2024

(54) COMPOSITIONS AND METHODS FOR ATTRACTING FIRE ANTS

(71) Applicant: The United States of America, as represented by The Secretary of Agriculture, Washington, DC (US)

(72) Inventor: Jian Chen, Greenville, MS (US)

(73) Assignee: The United States of America, as Represented by the Secretary of Agriculture, Washington, DC (US)

(*) Notice: Subject to any disclaimer, the term of this patent is extended or adjusted under 35 U.S.C. 154(b) by 0 days.

(21) Appl. No.: 17/879,968

(22) Filed: Aug. 3, 2022

(65) Prior Publication Data
US 2023/0056428 A1 Feb. 23, 2023

Related U.S. Application Data

(60) Provisional application No. 63/231,816, filed on Aug. 11, 2021.

(51) Int. Cl.
*A01N 37/42* (2006.01)
*A01N 25/00* (2006.01)
(52) U.S. Cl.
CPC .................................. *A01N 25/006* (2013.01)
(58) Field of Classification Search
None
See application file for complete search history.

(56) References Cited

U.S. PATENT DOCUMENTS 10,568,320 B2  2/2020 Vander Meer et al.

FOREIGN PATENT DOCUMENTS

| CN | 102524049 A | * | 7/2012 | | |
| CN | 102823628 A | * | 12/2012 | | |
| CN | 104255668 A | * | 1/2015 | ............. | A01K 47/00 |
| CN | 107889697 A | * | 4/2018 | ............. | A01H 1/025 |

OTHER PUBLICATIONS

Alvarez, F.M., et al., 1987, "Synthesis of Homoparnesenes: Trail Pheromone Components of the Fire Ant, Solenopsis Invicta," Tetrahedron 43(13): 2897-2900.
Butler, C.G., et al., 1962, "The isolation and synthesis of queen substance, 9-oxodec-trans-2-enoic acid, a honeybee pheromone," Proc. Royal Soc. B 155: 417-432.
Butler, C.G., et al., 1967, "Attraction of Apis mellifera Drones by the Odours of the Queens of Two Other Species of Honeybees," Nature 213: 423-424. Published Jan. 28,[Not Available].
Cantrell, C.L., et al., 2008, "Isolation and Identification of Antifungal Fatty Acids from the Basidiomycete Gomphus floccosus," J. Agric. Food Chem. 56(13): 5062-5068.
Chen, J., and M.J. Grodowitz, 2017, "Tyramides in male alates of black imported fire ants Solenopsis richteri," Insect Sci. 24(1): 169-172.
Choma, A., et al., 2000, "Occurrence and Taxonomic Significance of Oxo-fatty Acids in Lipopolysaccharides from Members of Mesorhizobium," Syst. Appl. Microbiol. 23: 185-190.
Daulatabad, C.D., et al., 1996, "A keto fatty acid from Smilax macrophylla seed oil," Phytochemistry 42(3): 889-890.
Guan, D., et al., 2014, "Electroantennogram and Behavioral Responses of the Imported Fire Ant, Solenopsis invicta Buren, to an Alarm Pheromone Component and Its Analogues," J. Agric. Food Chem. 62(49): 11924-11932.
Ishmuratov, G.Y., et al., 2011, "New approach to the synthesis of 9-oxo-2E-decenoic acid, a multifunctional pheromone of queen honeybee, from the telomer of butadiene and water," Chem. Nat. Compd. 47: 789-791.
Jones, T.H., et al., 2010, "Caste-Specific Tyramides from Myrmicine Ants†," J. Nat. Prod., 73(3): 313-316.
Lange, A.B., 2009, "Tyramine: From octopamine precursor to neuroactive chemical in insects," Gen. Comp. Endocrinol. 162: 18-26.
Maile, R., et al., 1998, "Sampling techniques for gas chromatographic-mass spectrometric analysis of long-chain free fatty acids from insect exocrine glands," J. Chromatogr. A, 816(2): 169-175.
Napper, E., and J.A. Pickett, Alarm pheromones of insects. IN: Encyclopedia of Entomology (ed. by J. L. Capinera), Springer, Dordrecht, 2008, https://doi.org/10.1007/978-1-4020-6359-6_125. [Not Available].
Ortius-Lechner, D., et al., 2000, "Metapleural Gland Secretion of the Leaf-cutter Ant Acromyrmex octospinosus: New Compounds and Their Functional Significance," J. Chem. Ecol., 26(7): 1667-1683.
Rocca, J.R., et al., 1983, "The queen recognition pheromone of solenopsis invicta, preparation of (E-6-(1-pentenyl)-2H-byran-2-one," Tetrahedron Lett. 24(18): 1889-1892.
Rocca, J.R., et al., 1983, "Synthesis and stereochemistry of tetrahydro-3, 5-dimethyl-6-(1)methylbutyl)-2H-pyran-2-one, a component of the queen recognition pheromone of solenopsis invicta," Tetrahedron Lett. 24(18): 1893-1896.
Roeder, T. , 2005, "Tyramine and Octopamine: Ruling Behavior and Metabolism," Ann. Rev. Entomol. 50: 447-477.
Sannasi, A., and G.S. Rajulu, 1971, "9-oxodec-trans-2-enoic acid in the Indian honeybees," Life Sciences 10(part II): 195-201.
Sannasi, A., and C.J. George, 1972, "9-oxodec-trans-2-enoic acid in the Indian honeybees," Nature, 237: 457.
Shearer, D.A., et al., 1970, "Occurrence of 9-oxodec-trans-2-enoic acid in queens of Apis dorsata, Apis cerana, and Apis mellifera," J. Insect Physiol. 16: 1437-1441.
Simsek, S., and D.C. Doehlert, 2014, "Oxygenated fatty acids isolated from wheat bran slurries," Int. J. Food Sci. Nutr. 65: 803-808.
Slessor, K.N., et al., 2005, "Pheromone Communication in the Honeybee (*Apis mellifera* L.)," J. Chem. Ecol., 31(11): 2731-2745.

(Continued)

*Primary Examiner* — Alton N Pryor

(74) *Attorney, Agent, or Firm* — John Fado; Maria Restrepo-Hartwig

(57) ABSTRACT

Disclosed herein are compositions for attracting fire ants wherein the compositions contain at least one fire ant food source, and at least one of 10-oxo-dodecanoic acid, 11-oxo-dodecanoic acid, or a mixture thereof, and optionally a carrier. Disclosed are also methods for attracting fire ants, the methods involving treating an object or area with a fire ant-attracting effective amount of a composition of the invention.

22 Claims, 33 Drawing Sheets

(56) References Cited

OTHER PUBLICATIONS

Sun, Y., et al., 2017, "Electrophysiological and alarm behavioral responses of Solenopsis invicta Buren (Hymenoptera: Formicidae) to alkoxypyrazines," J. Asia-Pac. Entomol. 20(2): 541-546.

Takahashi, H., et al., 2015, "13-Oxo-9(Z), 11(E), 15(Z)-octadecatrienoic Acid Activates Peroxisome Proliferator-Activated Receptor [gamma] in Adipocytes," Lipids 50(1):3-12.

Takahashi, H., et al., 2014, "Localization of 9- and 13-oxo-octadecadienoic acids in tomato fruit," Biosci. Biotechnol. Biochem. 78: 1761-1764.

Valles, S.M. and S.D. Porter, 2003, "Identification of polygyne and monogyne fire ant colonies (*Solenopsis invicta*) by multiplex PCR of Gp-9 alleles," Insectes Soc. 50: 199-200.

Vander Meer, R.K., et al., 1980, " The Poison Sac of Red Imported Fire Ant Queens: Source of a Pheromone Attractant," Ann. Entomol. Soc. Am., 73: 609-612.

Vander Meer, R. K., et al., 1981, "Hydrocarbon components of the trail pheromone of the red imported fire ant, *Solenopsis invicta*," Tetrahedron Lett. 22: 1651-1654.

Vander Meer, R.K., et al., 1988, "Isolation of the trail recruitment pheromone of *Solenopsis invicta*," J. Chem. Ecol. 14 (3): 825-838.

Vander Meer, R.K. and C.S. Lofgren, 1988, "Use of chemical characters in defining populations of fire ants, Solenopsis saevissima complex, (Hymenoptera: Formicidae)," Florida Entomol. 71(3): 323-332.

Vander Meer, R. K., Potential role of pheromones in fire ant control, IN: Pest Management in the subtropics: Integrated best management—a Florida perspective (ed. by D. Rosen, F. D. Bennett & J. L. Capinera), pp. 223-232, Intercept Ltd., Andover, UK (1996). [Not Available].

Vander Meer, R.K., et al., 2010, "Isolation of a Pyrazine Alarm Pheromone Component from the Fire Ant, *Solenopsis invicta*," J. Chem. Ecol., 36(2): 163-170.

Vick, B.A., and D.C. Zimmerman, 1982, "Levels of Oxygenated Fatty Acids in Young Corn and Sunflower Plants," Plant Physiol. 69(5): 1103-1108.

Wanner, K.W., et al., 2007, "A honey bee odorant receptor for the queen substance 9-oxo-2-decenoic acid," Proc. Natl. Acad. Sci. USA, 104(36): 14383-14388.

Williams, H. J., et al., 1981, "Synthesis and purification of the allofarnesenes," Tetrahedron 37: 2763-2767.

Wossler, T.C., et al., 2006, "Virgin Queen Mandibular Gland Signals of Apis mellifera capensis Change with Age and Affect Honeybee Worker Responses," J. Chem. Ecol. 32: 1043-1056.

\* cited by examiner

Triethyl aluminum

Cas: 97-93-8

Formula: $C_6H_{15}Al$

Exact Mass: 114.1

Oxacycloundecane-2,11-dione

Cas: 2561-88-8

Formula: $C_{10}H_{16}O_3$

Exact mass: 184.11

10-Oxo-dodecanoic acid

Cas: 2388-79-6

Formula: $C_{12}H_{22}O_3$

Exact mass: 214.16

Undecanedioic acid

Cas: 1852-04-6

Formula: $C_{11}H_{20}O_4$

Exact mass: 216.14

Methyl lithium

Cas: 917-54-4

Formula: $C_1H_3Li_1$

Exact mass: 22.04

11-Oxo-dodecanoic acid

Cas: 2388-75-5

Formula: $C_{12}H_{22}O_3$

Exact mass: 214.16

COMPOSITIONS AND METHODS FOR ATTRACTING FIRE ANTS

CROSS-REFERENCE TO RELATED APPLICATIONS

This application claims the benefit of U.S. Provisional Patent Application No. 63/231,816, filed Aug. 11, 2021, which is incorporated herein by reference in its entirety.

FIELD OF THE INVENTION

The invention relates to compositions containing at least one of 10-oxo-dodecanoic acid, 11-oxo-dodecanoic acid, or a mixture thereof for attracting fire ants. Disclosed are also methods for attracting fire ants involving treating an object or area with an effective amount of a fire ant-attracting composition of the invention.

BACKGROUND OF THE INVENTION

Red imported fire ant, *Solenopsis invicta* Buren (Hymenoptera: Formicidae) (hereafter fire ant) is an important invasive pest ant (Lowe, S., et al., 100 of the world's worst invasive alien species. A selection from the global invasive species database. Published by The Invasive Species Specialist Group (ISSG) a specialist group of the Species Survival Commission (SSC) of the World Conservation Union (IUCN), 12 p. (2004)). It was inadvertently introduced into the United States from South America in the 1930s. Due to their poison venom, stings of fire ant workers can cause various medical problems, such as localized sterile blisters, anaphylactic shock, and even death. Fire ants are also a significant pest in agriculture since they damage numerous crops such as corn, soybeans, okra, and citrus, and girdle young trees. The large earth mounds also interfere with the operation of agricultural machinery in the field. They can also significantly impact wildlife and dramatically reduce populations of certain species, either directly by predation on certain life stages or indirectly by reducing critical food sources. Fire ants can also damage electrical equipment. Fire ants cause $6.7 billion annual loss in the United States for damage repair, medical care, and control (Lard, C. F., et al., An economic impact of imported fire ants in the United States of America. Texas A&M University, College Station, Texas, August 2006, 22 p. (2006)). Likely due to the growth of global trading, *S. invicta* has now spread to more than 20 countries and territories and become a significant global pest (Ascunce, M. S., et al., Science, 331(6020): 1066-1068 (2011); Wylie, R., Ecological Research, 35: 6-16(2019).

Bait is one of the major tools used in controlling pest ants and which exploits ant collective foraging behavior. Bait delivers at least one active ingredient (insecticide) to the ant colonies using material that ants sense to be a food. A typical fire ant bait is composed of a fire ant food source such as soybean oil, a slow-acting insecticide such as hydramethylnon, and a particle carrier such as defatted corn grit. The carrier serves as an oil absorber, which not only facilitates foraging ants to collect the bait, but also makes it easier to broadcast the bait product over a large area. Foraging worker ants find the bait particles and transport them back to the colony. The active ingredient will be distributed inside the colony by food sharing, a characteristic cooperation in social insects. Attractants and feeding stimulants can be used to improve bait efficacy by facilitating the finding and acceptance of the bait by ants and circulation of the active ingredient in the colony. As a social insect, fire ants use a number of pheromones in coordinating their colonial activities.

Utilization of pheromones in fire ant baits has been extensively investigated, particularly the alarm pheromone and queen attraction pheromones. Alarm pheromone is defined as chemical substances produced and released by an organism that warn or alert another of the same species of impending danger (Napper, E., and J. A. Pickett, Alarm pheromones of insects. IN: Encyclopedia of Entomology (ed. by J. L. Capinera), Springer, Dordrecht, 2008, https://doi.org/10.1007/978-1-4020-6359-6_125). 2-ethyl-3,6-dimethylpyrazine is an alarm pheromone of *S. invicta* and both workers and alates produce this pheromone (Vander Meer, R. K., et al., J. Chem. Ecol., 36(2): 163-170 (2010)). A characteristic response of fire ants to alarm pheromone is to move rapidly to emission sources (Guan, D., et al., J. Agric. Food Chem., 62(49): 11924-11932 (2014)). It was found that bait containing alarm pheromone or its analogs, or bait accompanied with pheromone treated filter papers, attracted and recruited significantly more fire ant workers than the control (Guan et al., 2014; Sun, Y., et al., J. Asia-Pac. Entomol., 20(2): 541-546 (2017)).

A pheromone was found in the poison gland of fire ant queens which is highly attractive to workers (Vander Meer, R. K., et al., Ann. Entomol. Soc. Am., 73: 609-612 (1980)). Three components of fire ant queen pheromone were identified, synthesized (Rocca, J. R., et al., Tetrahedron Lett., 24(18): 1889-1892 (1983a); Rocca, J. R., et al., Tetrahedron Lett., 24(18): 1893-1896 (1983b)), and tested as fire ant bait attractants (Vander Meer, R. K., Potential role of pheromones in fire ant control, IN: Pest Management in the subtropics: Integrated pest management—a Florida perspective (ed. by D. Rosen, F. D. Bennett & J. L. Capinera), pp. 223-232, Intercept Ltd., Andover, UK (1996)), including (E)-6-(1-pentyl)-2H-pyran-2-one, invictolide, and dihydroactinidiolide. Although at one queen equivalent, no single component was active; however, at elevated concentrations, racemic invictolide showed excellent attraction. Attraction was also demonstrated for various combinations of three components and two components mixtures (Vander Meer, 1996).

The recruitment pheromone in fire ant workers has been well studied. The complicated recruitment process of fire ants has been divided into three subcategories: attraction, orientation induction, and pheromones involved in each subcategory have been extensively investigated. The trail pheromone of *S. invicta* was first characterized as a sesquiterpene hydrocarbon in the 1970s. In the 1980s, knowledge on fire ant recruitment pheromone had been extensively advanced. Two farnesenes, (Z, E)-α-farnesene and (E, E)-α-farnesene, and two homofarnesenes, (Z, E)-α-homofarnesene and (Z, Z)-α-homofarnesene (Vander Meer, R. K., et al., Tetrahedron Letters, 22: 1651-1654 (1981)), and an allofarnesene, (Z, Z,Z)-allofarnesene (Williams, H. J., et al., Tetrahedron, 37: 2763-2767 (1981)) were isolated and identified, and four isomeric homofarnesenes, 3,4,7,11-tetramethyl-1,3,6,10-dodecatetraenes were synthesized (Alvarez, F. M., et al., Tetrahedron, 43: 2897-2900 (1987)). (Z,E)-α-farnesene and an unidentified homosesquiterpene consisting of three rings and one double bond were responsible for worker attraction. Unfortunately, a combination of these two compounds was required for the attraction (Vander Meer, R. K., et al., J. Chem. Ecol., 14(3): 825-838 (1988)). The identity of the homosesquiterpene with three rings has not been finalized which may have prevented its use in fire ant bait products.

In addition to queens, attraction to workers is also manifested in both male and female alates, particularly in the activities just before their nuptial flight. Fire ants are believed to exhibit the male aggregation syndrome in their nuptial flights. The male alates are first to fly out of the colonies and form swarms in the air. The female alates then fly into the swarm for insemination. A serial of stereotyped activities happens before the alates taking off into the air. Workers open the nest tunnels to the outside. Alates first aggregate at these openings and then move out the nest with highly excited workers. Ants move about on the mound and surrounding vegetations before the alates take off. Workers frequently form retinues around individual female and male alates, indicating the presence of attract pheromones in the alates of both sexes. Since female and male alates and workers all produce the alarm pheromone, 2-ethyl-3,6-dimethylpyrazine, it has been suggested to be involved in fire ant nuptial flight initiation (Vander Meer et al., 2010). However, whether the alarm pheromone indeed play a role in this worker-to-alate attraction is kept unknown.

Male alates have very unique chemical profiles when compared to ants in the other castes. Like many other myrmicine ants, fire ant male alates produce tyramides (Jones, T. H., et al., J. Nat. Prod., 73(3): 313-316 (2010; Chen, J., and M. J. Grodowitz, Insect Sci., 24(1): 169-172 (2017); Vander Meer, R. K., and S. P. Chinta, U.S. Pat. No. 10,568,320). Tyramides are derivatives of tyramine, a well-known mediator of diverse physiological and behavioral functions within the insects (Lange, A. B., Gen. Comp. Endocrinol., 162: 18-26 (2008); Roeder, T., Ann. Rev. Entomol., 50: 447-477 (2005)). Tyramides were found causing mortality and detrimental effects to fire ants. These compounds have been patented as active ingredients to control pest ants (Vander Meer & Chinta, 2020). Whether these tyramides function as worker attractants is unknown.

Thus, there is currently a need for new fire ant bait products and the improvement of the efficacy of existing fire ant bait products.

SUMMARY OF THE INVENTION

Disclosed herein are compositions for attracting fire ants wherein the compositions comprise at least one of 9-oxo-2-decenoic acid, 10-oxo-dodecanoic acid, 11-oxo-dodecanoic acid, or a mixture thereof. Also disclosed are methods for attracting fire ants involving treating an object or area with an effective amount of a fire ant-attracting composition.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

In an embodiment, the invention relates to a composition comprising at least one fire ant food source, and at least one of 9-oxo-2-decenoic acid, 10-oxo-dodecanoic acid, 11-oxo-dodecanoic acid, or a mixture thereof, optionally a carrier, and optionally a fire ant insecticide. In some embodiments of the invention, the fire ant food source in a composition of the invention is a vegetable oil. In some embodiments of the invention, the vegetable oil in a composition of the invention is canola oil, cottonseed oil, grapeseed oil, rapeseed oil, soybean oil, safflower oil, peanut oil, corn oil, olive oil, palm oil, or sunflower oil. In some embodiments of the invention the composition comprises an agronomically-, physiologically-, or pharmaceutically-acceptable carrier. In some embodiments of the invention, the carrier in a composition of the invention is at least one of a mineral oil, a paraffin, a silicon oil, water, a membrane, a sachet, a disk, a rope, a vial, a tubes, a septa, a resin, a hollow fiber, a microcapsule, a filter, a gel, a fiber, a natural polymer, a synthetic polymer, an elastomer, or a mixture thereof. In some embodiments of the invention, the carrier in a composition of the invention is at least one of an aqueous solution, a glycol, an alcohol, a ketone, an ester, a hydrocarbon, a halogenated hydrocarbon, a polyvinyl chloride, a clay, a laminate, a cellulosic matrix, a rubber matrix, a synthetic polymer matrix, or a mixture thereof. In some embodiments of the invention, the composition comprises a fire ant insecticide.

In an embodiment, the invention relates to a method for attracting fire ants, said method comprising treating an object or area with a fire ant attracting effective amount of a composition comprising at least one fire ant food source, and at least one of 9-oxo-2-decenoic acid, 10-oxo-dodecanoic acid, 11-oxo-dodecanoic acid, or a mixture thereof, optionally a carrier, and optionally a fire ant insecticide.

In an embodiment, the invention relates to a kit comprising at least one fire ant food source, and at least one of 9-oxo-2-decenoic acid, 10-oxo-dodecanoic acid, 11-oxo-dodecanoic acid, or a mixture thereof, optionally a carrier, and optionally a fire ant insecticide.

BRIEF DESCRIPTION OF THE DRAWINGS

FIG. 2A shows the spectra from 3.0 to 8.0 ppm. FIG. 2B shows the spectra from 0.0 to 3.5 ppm. ($^1$H NMR (400 MHz, CDCl$_3$) δ 2.45 (m, 4H), 2.38 (t, J=7.4 Hz, 2H), 1.60 (m, 4H), 1.33 (s, 8H), 1.09 (t, J=7.4 Hz, 3H)).

FIG. 3A shows the spectra from 95 to 220 ppm. FIG. 3B shows the spectra from 0 to 95 ppm. ($^{13}$C NMR (101 MHz, CDCl$_3$) δ 212.20, 179.89, 42.38, 35.87, 34.01, 29.16, 29.03, 28.96, 24.61, 23.86, 7.84).

FIG. 6A shows the spectra from 3.0 to 7.5 ppm. FIG. 6B shows the spectra from 0.0 to 3.5 ppm. ($^1$H NMR (400 MHz, CDCl$_3$), δ 2.41 (t, J=7.4 Hz, 2H), 2.33 (t, J=7.5 Hz, 2H), 2.13 (s, 3H), 1.60 (m, 2H), 1.55 (m, 2H), 1.26 (s, 10H)).

FIG. 7A shows the spectra from 85 to 235 ppm. FIG. 7B shows the spectra from 0 to 85 ppm. ($^{13}$C NMR (101 MHz, CDCl$_3$) δ 209.68, 179.82, 43.79, 34.02, 29.87, 29.28, 29.20, 29.14, 29.10, 28.99, 24.64, 23.81).

FIG. 10A shows data of 10-oxo-dodecanoic acid in the sample. FIG. 10B shows data of synthetic 10-oxo-dodecanoic acid standard.

FIG. 11A shows data of 11-oxo-dodecanoic acid in the sample. FIG. 11B shows data of synthetic 11-oxo-dodecanoic acid standard.

FIG. 15A shows the number of ants attracted by mixtures at 1.98 mg/ml (paired t test: t=−3.66, P=0.005). FIG. 15B shows the number of ants attracted by mixtures at 0.198 mg/ml: t=−2.82, P=0.02.

FIG. 20A shows the consumption of oil containing 0.00 mg/g; 9.09 mg/g; 4.54 mg/g; 2.27 mg/g; and 1.14 mg/g 10-oxo-dodecanoic acid. FIG. 20B shows the consumption of oil containing 0.00 mg/g; 0.51 mg/g; 0.28 mg/g; 0.142 mg/g; and 0.07 mg/g 10-oxo-dodecanoic acid in multiple-choice bioassays.

FIG. 21A shows the consumption of oil with 0.00 mg/g; 8.62 mg/g; 4.31 mg/g; 2.15 mg/g; and 1.08 mg/g 11-oxo-dodecanoic acid. FIG. 21B shows the consumption of soybean oil containing 0.00 mg/g; 0.54 mg/g; 0.27 mg/g; 0.14 mg/g; and 0.07 mg/g 11-oxo-dodecanoic acid in multiple-choice bioassays.

FIG. 29A shows a graph of the consumption of oil containing 1.14 mg/g 10-oxo-decanoic acid or 0.19 mg/g trans, trans-2,4-heptadienal. FIG. 29B shows a graph of the consumption of oil containing 1.08 mg/g 11-oxo-dodecanoic acid or 0.19 mg/g trans, trans-2,4-heptadienal. FIG. 29C shows a graph of the consumption of oil containing 1.14 mg/g 10-oxo-dodecanoic acid or 0.004 mg/g 2-ethyl-3,6 (5)-dimethylpyrazine. FIG. 29D shows a graph of the consumption of oil containing 1.08 mg/g 11-oxo-dodecanoic acid or 0.004 mg/g 2-ethyl-3,6 (5)-dimethylpyrazine.

DETAILED DESCRIPTION

Figure 1:
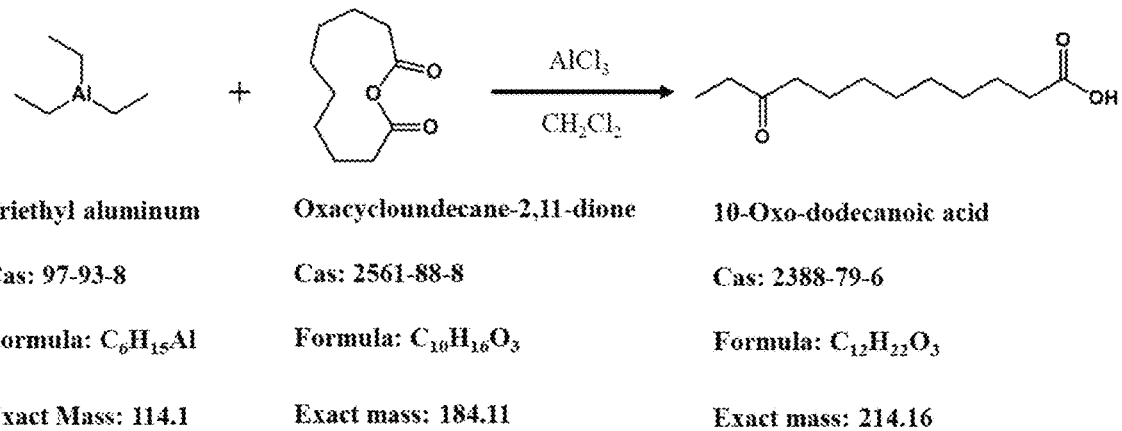
FIG. 1 shows a schematic of a reaction for preparing 10-Oxo-dodecanoic acid as described herein.

The present invention relates to compositions for attracting fire ants, said compositions containing at least a fire ant food source and at least one of 10-oxo-dodecanoic acid, 11-oxo-dodecanoic acid, or a mixture thereof. Also disclosed are methods for attracting fire ants, said methods involving treating an object or area with an effective amount of the fire ant-attracting composition of the invention.

The fire ant food source in a composition for attracting fire ants can be any food source which will be consumed by fire ants. For example, the food source may be a vegetable oil such as canola oil, cottonseed oil, grapeseed oil, rapeseed oil, soybean oil, safflower oil, peanut oil, corn oil, olive oil, palm oil, or sunflower oil.

Other compounds (e.g., known fire ant attractant) may be added to the composition provided they do not substantially interfere with the intended activity and efficacy of the composition; whether or not a compound interferes with activity and/or efficacy can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising a carrier" means that the composition may or may not contain a carrier and that this description includes compositions that contain and do not contain a carrier. Also, by example, the phrase "optionally adding a carrier" means that the method may or may not involve adding a carrier to the composition used in the method, and that this description includes methods that involve and do not involve adding a carrier to the fire ant-attracting composition.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed, and the processing conditions observed. Thus, it is not possible to specify an exact "effective amount." However, an appropriate effective amount may be determined by one of ordinary skill in the art using only routine experimentation.

The compounds described herein, or compositions described herein to be used will be at least an effective amount of the compound (e.g., 9-oxo-2-decenoic acid, 10-oxo-dodecanoic acid, 11-oxo-dodecanoic acid) or diluted solution of the compound. Generally, the concentration of the compounds will be, but not limited to, about 0.025% to about 10% (e.g., 0.025 to 10%, for example in acetone or soybean oil), preferably about 0.5% to about 4% (e.g., 0.5 to 4%), more preferably about 1% to about 2% (e.g., 1 to 2%).

Also disclosed herein are methods for attracting fire ants involving treating an object or area with an effective amount of a fire ant-attracting composition containing the compounds disclosed herein and optionally a carrier. The carrier can be any agronomically, physiologically, or pharmaceutically acceptable carrier. The carrier may be a liquid or a solid. The term "carrier" as used herein includes carrier materials such as those described below. As is known in the art, the vehicle or carrier to be used refers to a substrate such as a mineral oil, a paraffin, a silicon oil, water, a membrane, a sachet, a disk, a rope, a vial, a tube, a septa, a resin, a hollow fiber, a microcapsule, a filter, a gel, a fiber, a natural polymer, a synthetic polymer, an elastomer, or the like. All of these substrates have been used to controlled release effective amount of a composition containing the compounds disclosed herein in general and are well known in the art. Pregel defatted corn grit is commonly used in fire ant bait products. Suitable carriers are well-known in the art and are selected in accordance with the ultimate application of interest. Agronomically acceptable carriers include an aqueous solution, a glycol, an alcohol, a ketone, an ester, a hydrocarbon, a halogenated hydrocarbon, a polyvinyl chloride, and mixtures thereof. In addition, solid carriers may be such as a clay, a laminate, a cellulosic matrix, a rubber matrix, a synthetic polymer matrix, or the like. The carrier or carrier material as used herein, and also fire ant food source, is defined as not including the body of fire ants.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some, or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products. Although any methods and materials similar or equivalent to those described herein can be used in the practice or testing of the present invention, the preferred methods and materials are now described.

Oxo fatty acids are common in plants (Vick, B. A., and D. C. Zimmerman, Plant Physiol, 69: 1103-1108 (1982); Daulatabad, C. D., et al., Phytochemistry, 42: 889-890 (1996); Simsek, S., and D. C. Doehlert, Int. J. Food Sci. Nutr., 65: 803-808 (2014); Takahashi, H., et al., Lipids, 50, 3-12 (2014); Takahashi, H., et al, Biosci. Biotechnol. Biochem., 78: 1761-1764 (2015), bacteria (Choma, A., et al., Syst. Appl. Microbiol., 23: 185-190 (2000); and fungi (Cantrell, C. L., et al., J. Agric. Food Chem., 56: 5062-5068 (2008); however, they are very rare in insects. Only a few oxo fatty acids have been found in insects, occurring only in social insects, including 4-oxo-octanoic acid and 4-oxodecanoic acid in leaf-cutting ants (Maile, R., et al., J. Chromatogr. A, 816(2): 169-175 (1998); Ortius-Lechner, D., et al., J. Chem. Ecol., 26(7): 1667-1683 (2000)), and 9-oxo-decenoic acid in honey bee, *Apis mellifera* (Butler, C. G., et al., Proceedings of the Royal Society of London Series B Biological Sciences, 155: 417-432 (1962)), other bee species (Butler, C. G., et al., Nature, 213: 423 (1967); Shearer, D. A., et al., Journal of Insect Physiology, 16: 1437-1441 (1970); Sannasi, A., and G. S. Rajulu, Life Sciences, 10: 195-201 (1971); Wossler, T. C., et al., Journal of Chemical Ecology, 32: 1043-1056 (2006)), and one species of termite, *Odontotermes assuthi* (Sannasi, A., and C. J. George, Nature, 237: 457 (1972)).

9-oxo-decenoic acid is a major component of queen mandibular pheromone in honeybees, which is produced in the mandibular gland of the queens. It attracts workers and queen feed it to workers attending her. It also attracts drones during mating flights, so it is a sex pheromone. It is also a primer pheromone that inhibits worker ovary development (Slessor, K. N., et al., J. Chem. Ecol., 31: 2731-2745 (2005)). An odorant receptor (Or) has been identified for 9-oxo-2-decenoic acid (Wanner, K. W., et al., Proc. Natl. Acad. Sci. USA, 104: 14383-14388 (2007)). Although it has been more than 45 years after its discovery, 9-oxo-2-decenoic acid still remains the only long-distance sex pheromone identified in honeybees. Interestingly, 9-oxo-2-decenoic acid also exhibits significant antibacterial and anti-inflammatory property. It also acts as a wound-healing accelerator, antidote, and immunomodulator (Ishmuratov, G. Y., et al., Chemistry of Natural Compounds 47: 789-791 (2011)).

4-oxo-octanoic acid and 4-oxodecanoic acid were found in the metapleural gland secretions of Acromyrmex octospinosus, a myrmicine leaf-cutting ant species. Their symbiotic relationship with fungus is well known. The fungus provides ants with food and in return the ants provide leaf fragments for cultivating fungus and maintain the optimal growth conditions of the fungus garden. Ants protect the fungus by inhibiting the growth of competing organism using chemical means. 4-oxo-octanoic acid and 4-oxodecanoic acid are believed to be involved in such chemical protection.

Since both 10-oxo- and 11-oxo-dodecanoic acids were found only in the reproductive systems of the male alates, it is very likely that they are involved in the fire ant reproduction process. The inventors single sensillum recording data show both workers and female alates responses to both oxo acids, indicating their potential pheromonal functions. However, their exact functions can only be elucidated by further investigation.

It is known that a compound that attracts fire ants is not necessary a feeding stimulant. In fact, an attractant can be a feeding deterrent when the compound is incorporated into the fire ant food source. An ideal compound for improving fire ant bait is one that functions as both attractant and feeding stimulant. Our data surprisingly demonstrated that both 10-oxo-dodecanoic acid and 11-oxo-dodecanoic acid are such compounds. To our best knowledge, these two compounds have neither been reported as attractant or feeding stimulants for any insects.

The result on the dosages bioassay of 10-oxo-dodecanoic acid and 11-oxo-dodecanoic acid indicated that both of these acids have a quite narrow range of active concentrations. The most active concentration for 10-oxo-dodecanoic acid ranged from 0.51 to 1.14 mg/g. The most effective concentration for 11-oxo-dodecanoic acid was around 1.08 mg/g. Among five tested oxo fatty acid analogs, only 9-oxo-2-decenoic acid at 0.049 mg/g significantly improved the feeding preference of fire ants on soybean oil, indicating that the effect of oxo fatty acids on fire ants is very structure-specific.

9-oxo-2-decenoic acid is a major component of queen mandibular pheromone in honeybee, which is produced in the mandibular gland of the queens. It attracts workers and queen feed it to workers attending her. It also attracts drones during mating flights, so it is a sex pheromone. It is also a primer pheromone that inhibits worker ovary development (Slessor et al., 2005). An odorant receptor (Or) has been identified for 9-oxo-2-decenoic acid (Wanner et al., 2007). Although it has been more than 45 years after its discovery, 9-oxo-2-decenoic acid still remains the only long-distance sex pheromone identified in honeybees. Interestingly, 9-oxo-2-decenoic acid also exhibits significant antibacterial and anti-inflammatory properties. It also acts as a wound-healing accelerator, antidote, and immunomodulator (Ishmuratov et al., 2011). It is not yet known whether these oxo fatty acids affect the development of fire ant colonies.

Both trans, trans-2,4-heptadienal and 2-ethyl-3,6 (5)-dimethylpyrazine have been reported as fire ant attractants (Vander Meer and Lofgren, 1999), and 2-ethyl-3,6-dimethylpyrazine has been identified as fire ant alarm pheromone component (Vander Meer et al., 2010). It was found that 2-ethyl-3,6 (5)-dimethylpyrazine was mostly preferred by fire ants at 30 ng/µl (Vander Meer et al., 2009).

In the multiple-choice bioassay, trans, trans-2,4-heptadienal performed best at 0.19 mg/g, although it was not significantly different to the control. This concentration was selected for the comparative two-choice bioassay with 10-oxo-dodecanoic acid and 11-oxo-dodecanoic acid. There was no significant difference in the effect on oil consumption between the two oxo fatty acids and trans, trans-2,4-heptadienal.

In the multiple-choice bioassay, 2-ethyl-3,6 (5)-dimethylpyrazine significantly improved the feeding preference of fire ant on soybean oil at 0.002 and 0.004 mg/g. At 0.004 mg/g, 2-ethyl-3,6 (5)-dimethylpyrazine caused significantly higher oil consumption than both oxo fatty acids in the two-choice bioassay.

Both trans, trans-2,4-heptadienal and 2-ethyl-3,6 (5)-dimethylpyrazine are very volatile compounds, which can cause difficulty in using them to improve fire ant bait efficacy. Both oxo dodecanoic acids and the oxo decanoic acid are much less volatile, which may make it much more practical to use them in fire ant bait development.

The following examples are intended only to further illustrate the invention and are not intended to limit the scope of the invention as defined by the claims.

Embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this invention, the same will be better understood by reference to certain specific examples, which are included herein only to further illustrate the invention and are not intended to limit the scope of the invention as defined by the claims.

All of the references cited herein, including U.S. patents and U.S. Patent Application Publications, are incorporated by reference in their entirety.

EXAMPLE 1

Materials and Methods

Listed in this Example are the Materials and Methods used to prepare compositions for attracting fire ants, and the Methods used to measure such attractions.

Ants: Colonies of *S. invicta* were collected from Washington County, Mississippi. All colonies were separated from mound soil using water dripping method (Banks, W.

A., et al., 1981, "Techniques for collecting, rearing, and handling imported fire ants," USDA, SEA, AATS-S-21, 9 p.) and maintained in plastic trays with the inside surface coated with FLUON synthetic resin. Colonies were kept in insect rearing room at 26° C. with approximately 70% relative humidity and 16:8 dark:light photoperiod. The ant species and social form of *S. invicta* colonies was determined using venom alkaloid profile and Polymerase Chain Reaction (PCR) on Gp-9 alleles, respectively (Vander Meer, R. K. and C. S. Lofgren, 1988, "Use of chemical characters in defining populations of fire ants, Solenopsis saevissima complex, (Hymenoptera: Formicidae)," Florida Entomol. 71(3): 323-332; Valles, S. M. and S. D. Porter, 2003, "Identification of polygyne and monogyne fire ant colonies (*Solenopsis invicta*) by multiplex PCR of Gp-9 alleles," Insect Soc. 50: 199-200). Colonies were fed with 15% sucrose and house cricket *Acheta domesticus* L.

Sample preparation and chemical analysis: The reproductive system was pulled out from male alates using forceps and placed in a glass insert, crushed using a metal wire, and extracted with 50 μL dichloromethane for at least 2 hours. No sample clean-up was needed. One microliter extraction was injected into the GC-MS. Chemical identification was confirmed by comparing the retention times and mass spectra of samples to those of synthetic standards. For quantification, 4,6-dioxoheptanoic acid was used as an internal standard. Each reproductive system was extracted using 50 μl 0.044 mg/ml 4,6-dioxoheptanoic acid dichloromethane solution. Standard curves were built using a series of 10-oxo-dodecanoic acid and 11-oxo-doedecanoic acid solutions that were prepared using 0.044 mg/ml 4,6-dioxoheptanoic acid dichloromethane solution. The ratios of peak areas of 10-oxo- and 11-oxo-dodecanoic acids to those of the 4,6-dioxoheptanoic acid were used to develop standard curves. Twelve male alates, each from a different colony, were used for quantification.

Gas Chromatography-Mass Spectrometry (GC-MS): An Agilent 7890A gas chromatograph coupled to an Agilent 5975 mass selective detector (Santa Clara, CA) was used. A DB-5 capillary column (30 m×0.25 mm i.d., 0.25 μm film thickness) was used. The following GC temperature program was used: initial temperature of 60° C., held for 5 minutes, increased to 240° C. at a rate of 20° C./minute and held for 10 minutes, and then increased to 280° C. at a rate of 20° C./minute and held for 20 minutes. Injection temperature was 250° C. and transfer line temperature was 270° C. The mass spectrometer was operated at 70 eV in the electron impact mode. Full scan mode was used.

EXAMPLE 2

Synthesis of Oxo-Fatty Acids 10-oxo-dodecanoic acid and 11-oxo-dodecanoic acid were prepared following previously reported protocols.

Figure 2A:
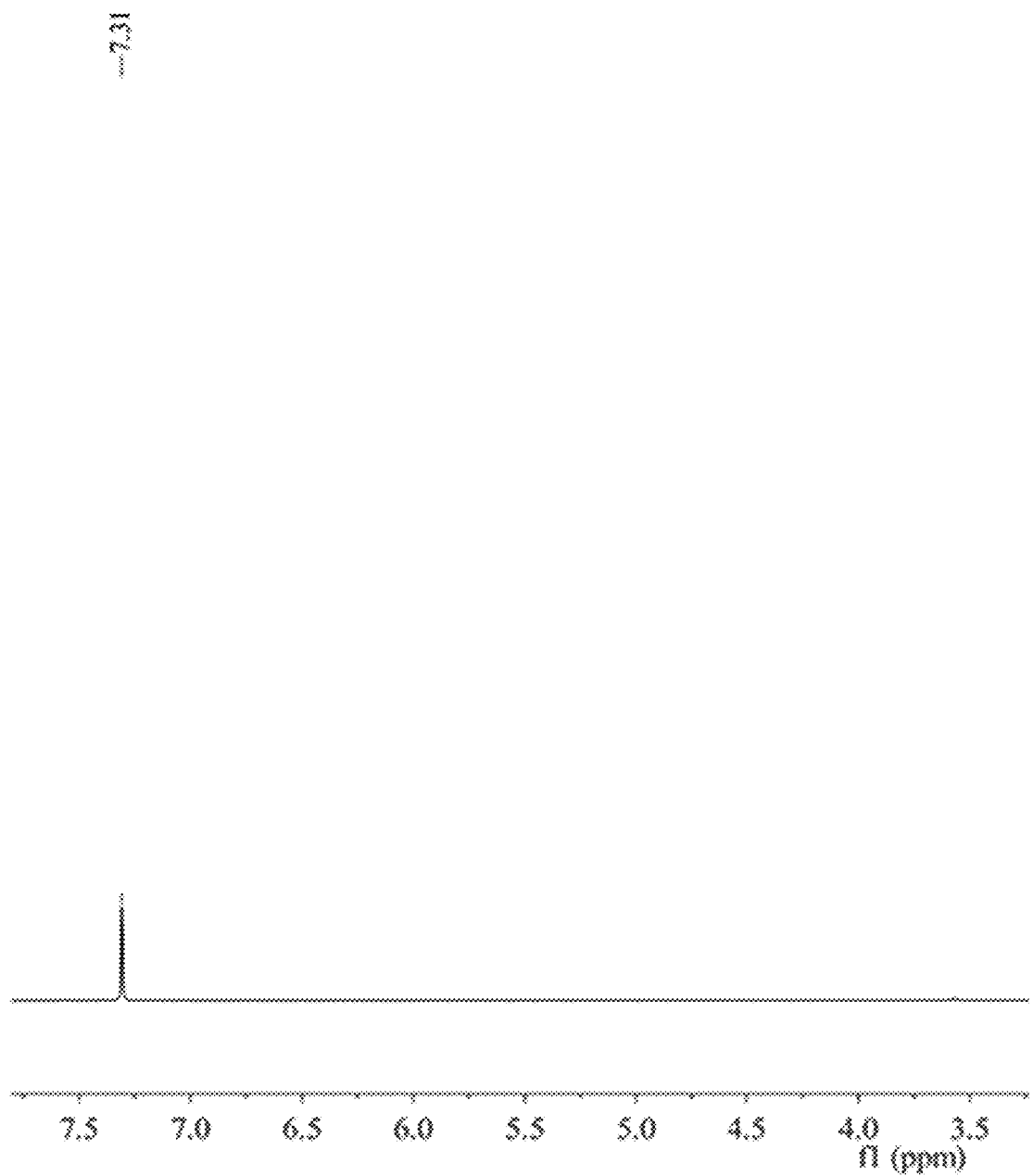
FIG. 2A and FIG. 2B depict graphs of the $^1$H NMR spectra of 10-oxo-dodecanoic acid.
Figure 2B:
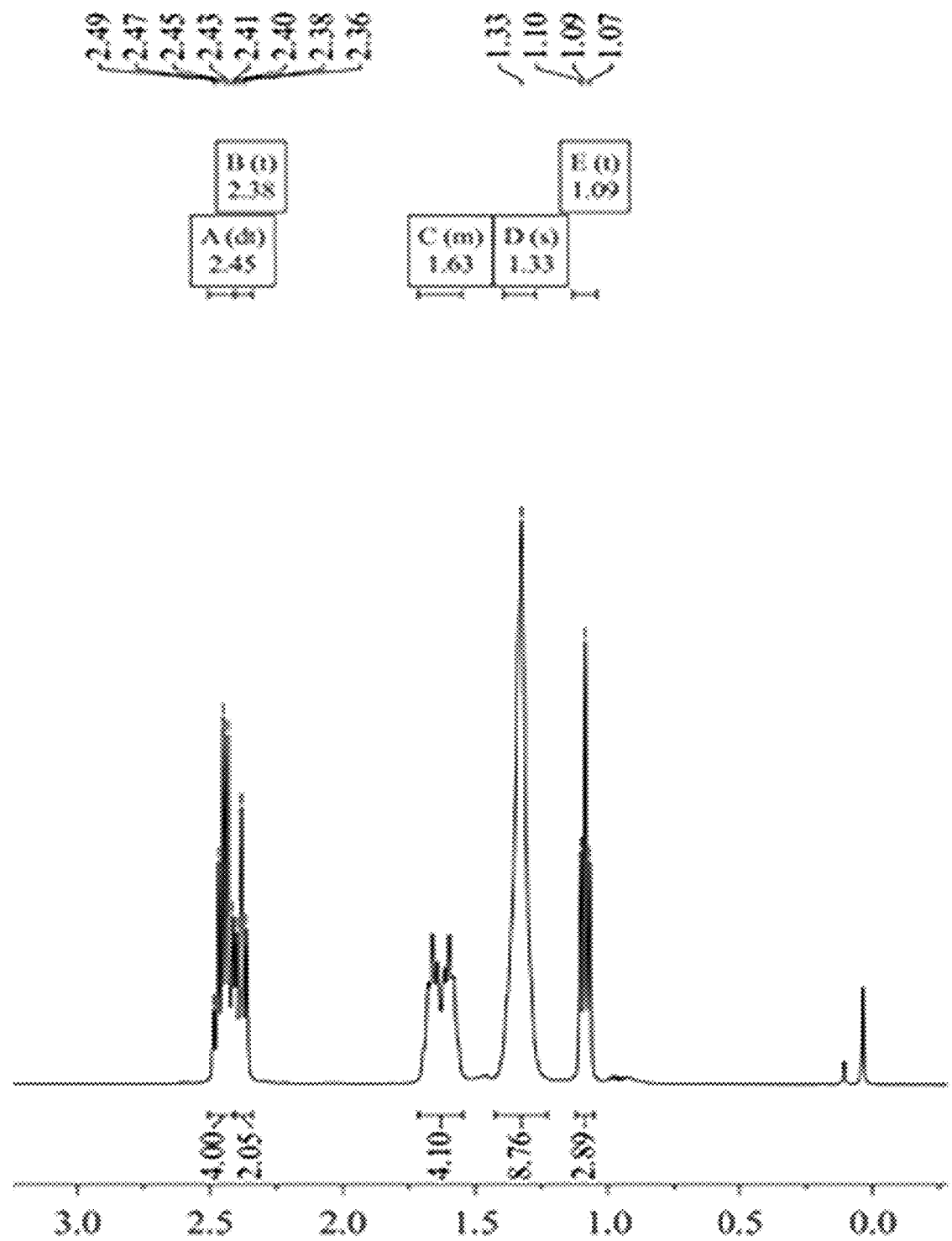
Figure 3A:
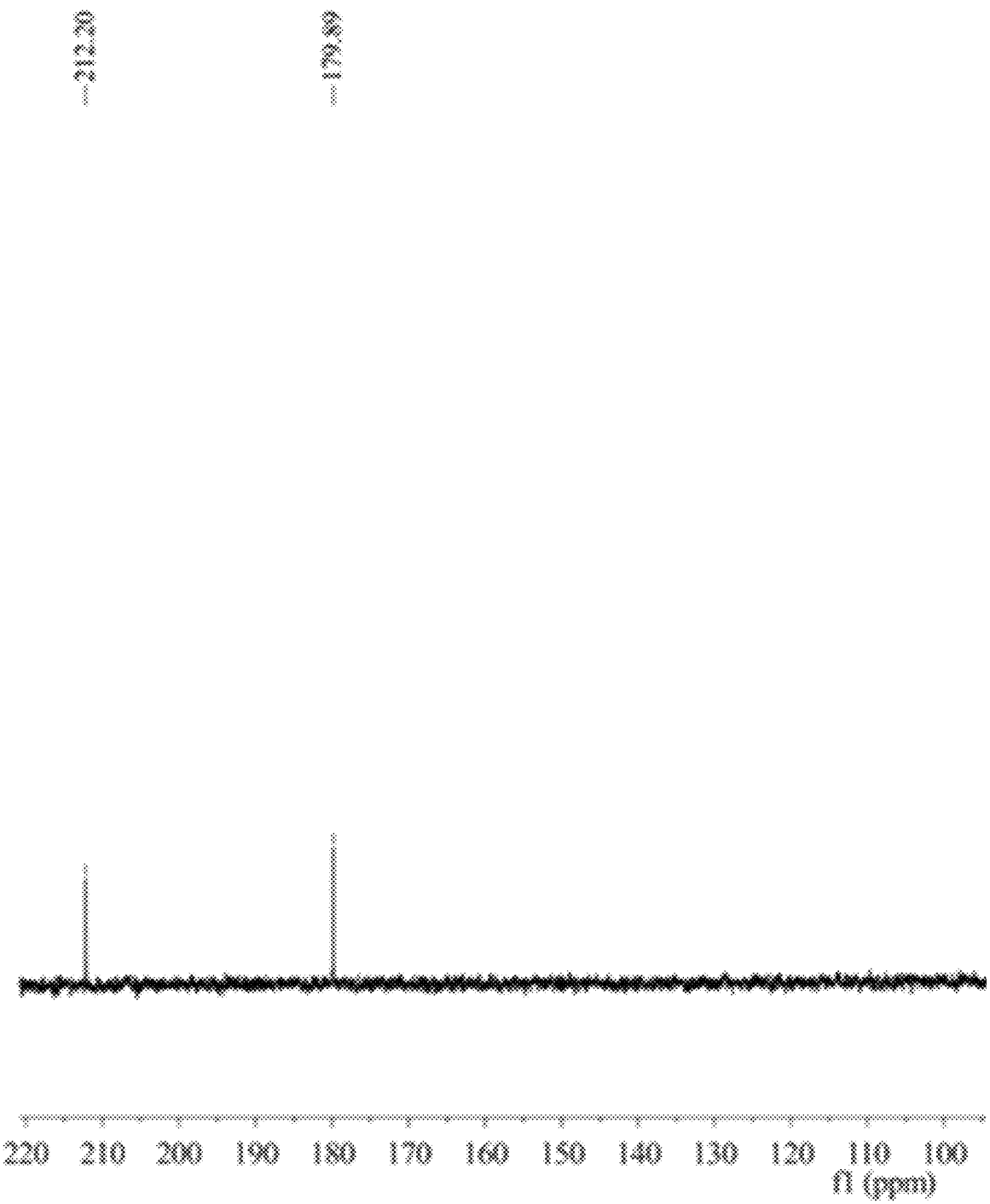
FIG. 3A and FIG. 3B depict a graphs of the $^{13}$C NMR spectra of 10-oxo-dodecanoic acid.
Figure 3B:
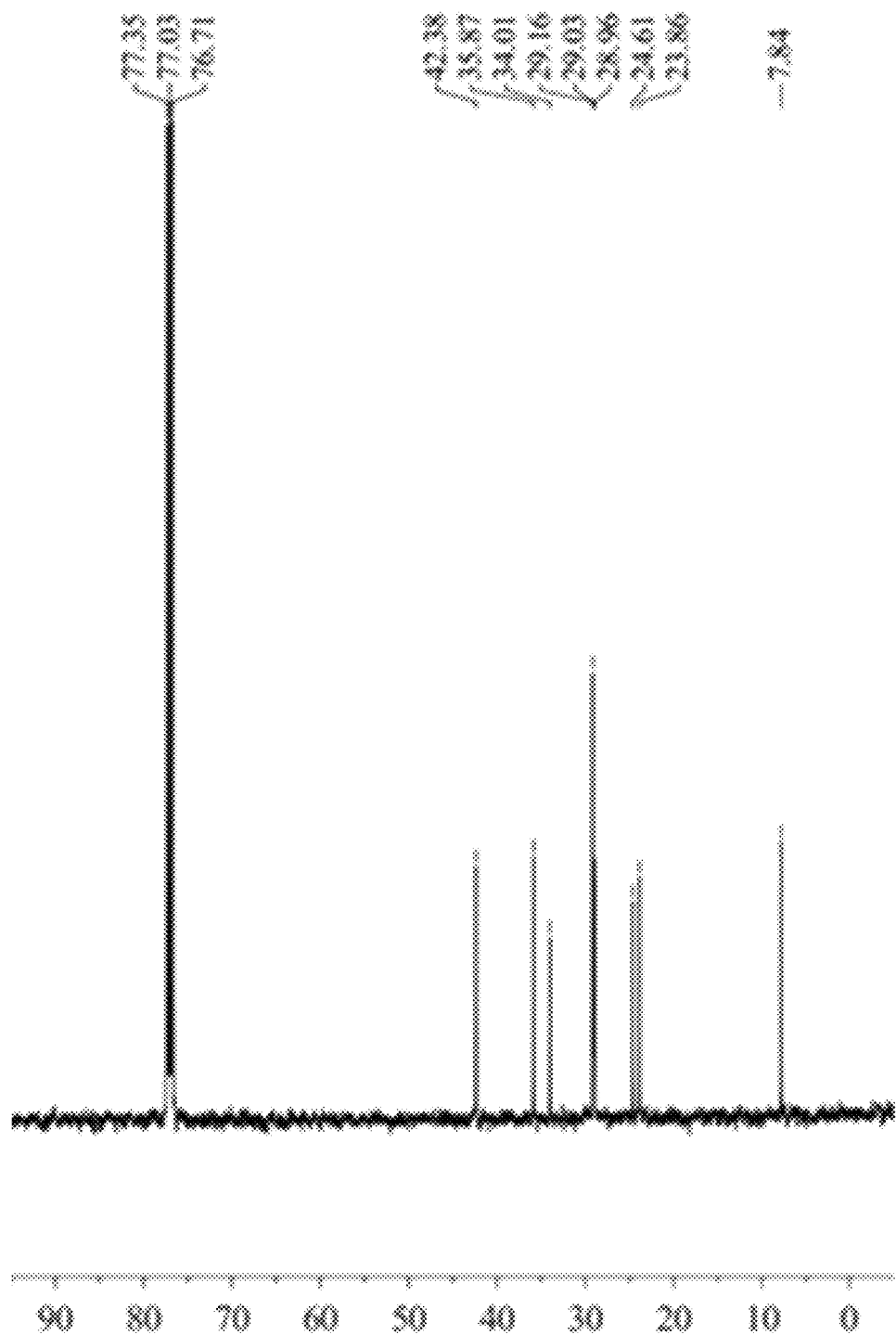
Figure 4:
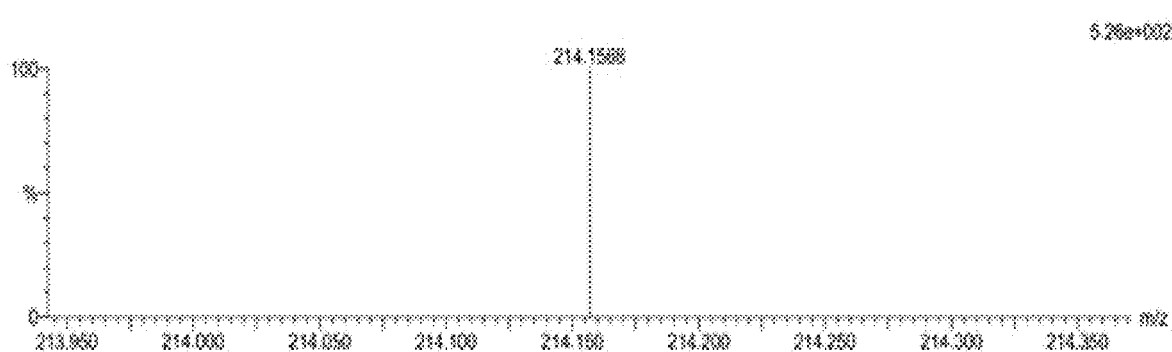
FIG. 4 depicts a graph of the HHY1 HR-MS spectra of 10-oxo-dodecanoic acid (HR-MS (ESI): m/z calculated for $C_{12}H_{22}O_3$: 214.1569; found: 214.1568).

10-oxo-dodecanoic acid was prepared following a previously reported protocol (Reinheckel, H., and K. Haage, 1966, "Preparation of Saturated and Unsaturated Ketocarboxylic Acids from Dicarboxylic Anhydrides and Alkylaluminum Compounds," Angew. Chem. Int. Ed. 5: 511-512). A schematic diagram of the reaction to prepare 10-oxo-dodecanoic acid is shown in FIG. 1. Under the protection of argon, 5 ml dichloromethane was introduced to a 25 ml three-necked flask and cooled to −10° C., then 1.7 g aluminum trichloride (12.8 mmol) and 13 ml triethyl aluminum (1.0 M in n-hexane) were added and stirred for one hour. In another 50 ml flask, 2.5 g polysebacic polyanhydride was suspended in 15 ml dichloromethane at −10° C. under argon conditions, then the above-mentioned mixture was added dropwise in 10 minutes and stirred one hour at −10° C., following which the mixture was allowed to react at room temperature for 5 hours. The reaction mixture was quenched with water and the pH was adjusted to 1-2 using 10% aqueous hydrochloride. The mixture was then extracted three times by 30 ml ethyl acetate. The organic layer was washed with water once, dried with anhydrous sodium sulfate, filtered, and the filtrate was concentrated to gum. The product was purified by silica gel column (petroleum ether:ethyl acetate:methanol=150:10:1-50:10:1) to get an oil in 43% yield. $^1$H NMR (400 MHz) and $^{13}$C NMR (101 MHz) spectra were recorded with a WNMR-I-400M spectrometer in CDCl3, with tetramethylsilane (TMS) serving as the internal standard. Chemical shift values (δ) were listed in parts per million (ppm). HR-EI MS data were obtained from a GCT Premier GC-TOFMA. the $^1$H NMR spectra of 10-oxo-dodecanoic acid is shown in FIG. 2 (400 MHz, CDCl$_3$) δ 2.45 (m, 4H), 2.38 (t, J=7.4 Hz, 2H), 1.60 (m, 4H), 1.33 (s, 8H), 1.09 (t, J=7.4 Hz, 3H). The $^{13}$C NMR spectra of 10-oxo-dodecanoic acid is shown in FIG. 3 ($^{13}$C NMR (101 MHz, CDCl$_3$) δ 212.20, 179.89, 42.38, 35.87, 34.01, 29.16, 29.03, 28.96, 24.61, 23.86, 7.84). The HHY1 HR-MS spectra of 10-oxo-dodecanoic acid is shown in FIG. 4 (HR-MS (ESI): m/z calculated for $C_{12}H_{22}O_3$: 214.1569; found: 214.1568). Tolerance=10.0 mDa/DBE: min=−1.5, max=50. Element prediction Off. Monoisotopic Mass, Odd and Even Electron Ions. 26 formula(e) evaluated with 1 results within limits (up to 70 best isotopic matches for each mass). Elements used: C 0-50; H: 0-100; O: 0-10.

Figure 5:
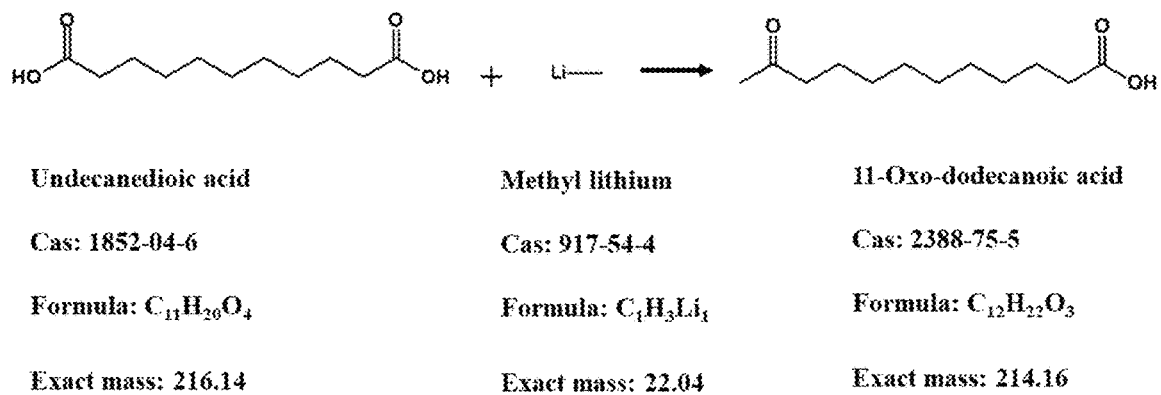
FIG. 5 depicts a reaction for preparing 11-Oxo-dodecanoic acid.
Figure 6A:
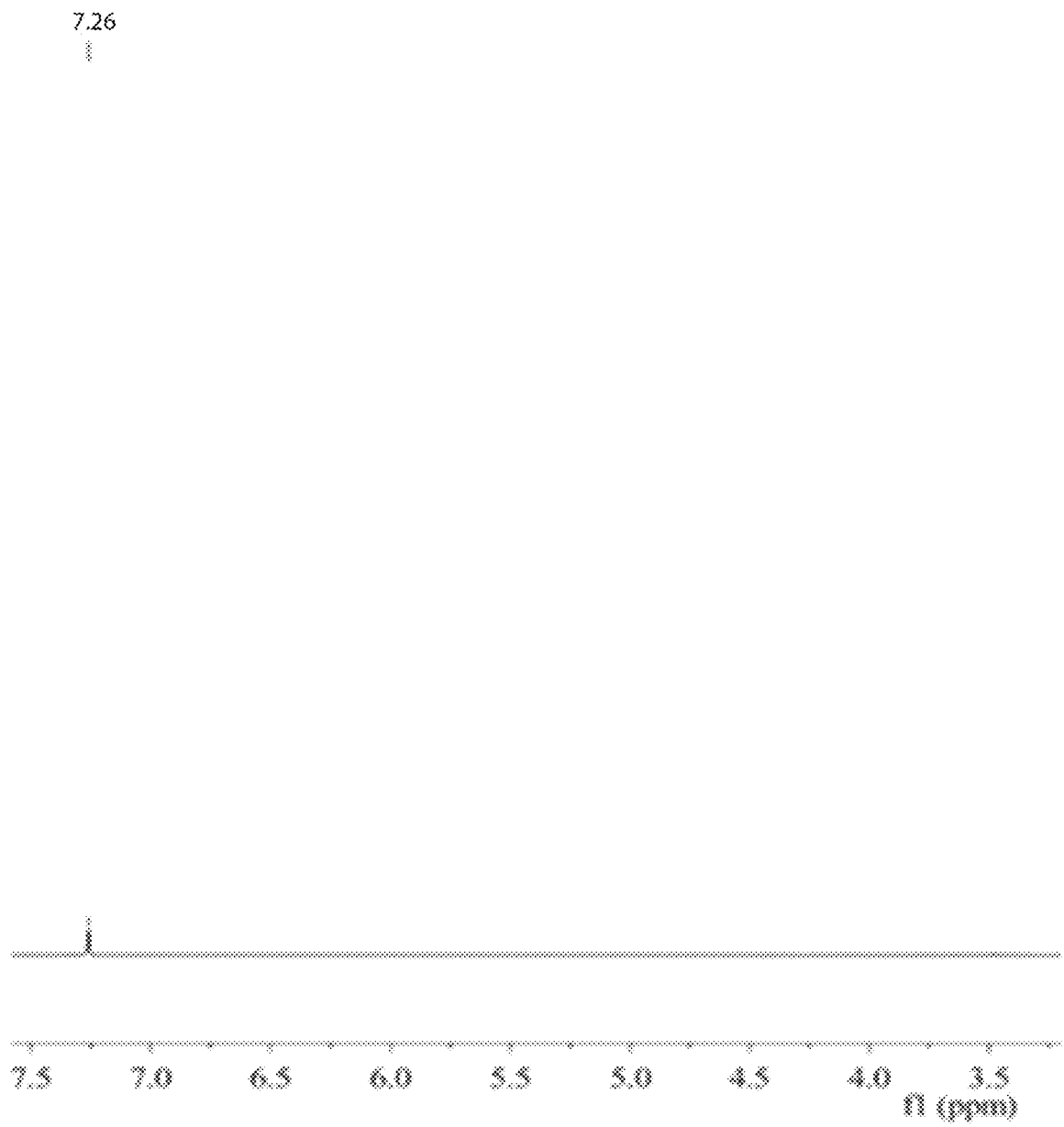
FIG. 6A and FIG. 6B depict graphs of the $^1$H NMR spectra of 11-oxo-dodecanoic acid.
Figure 6B:
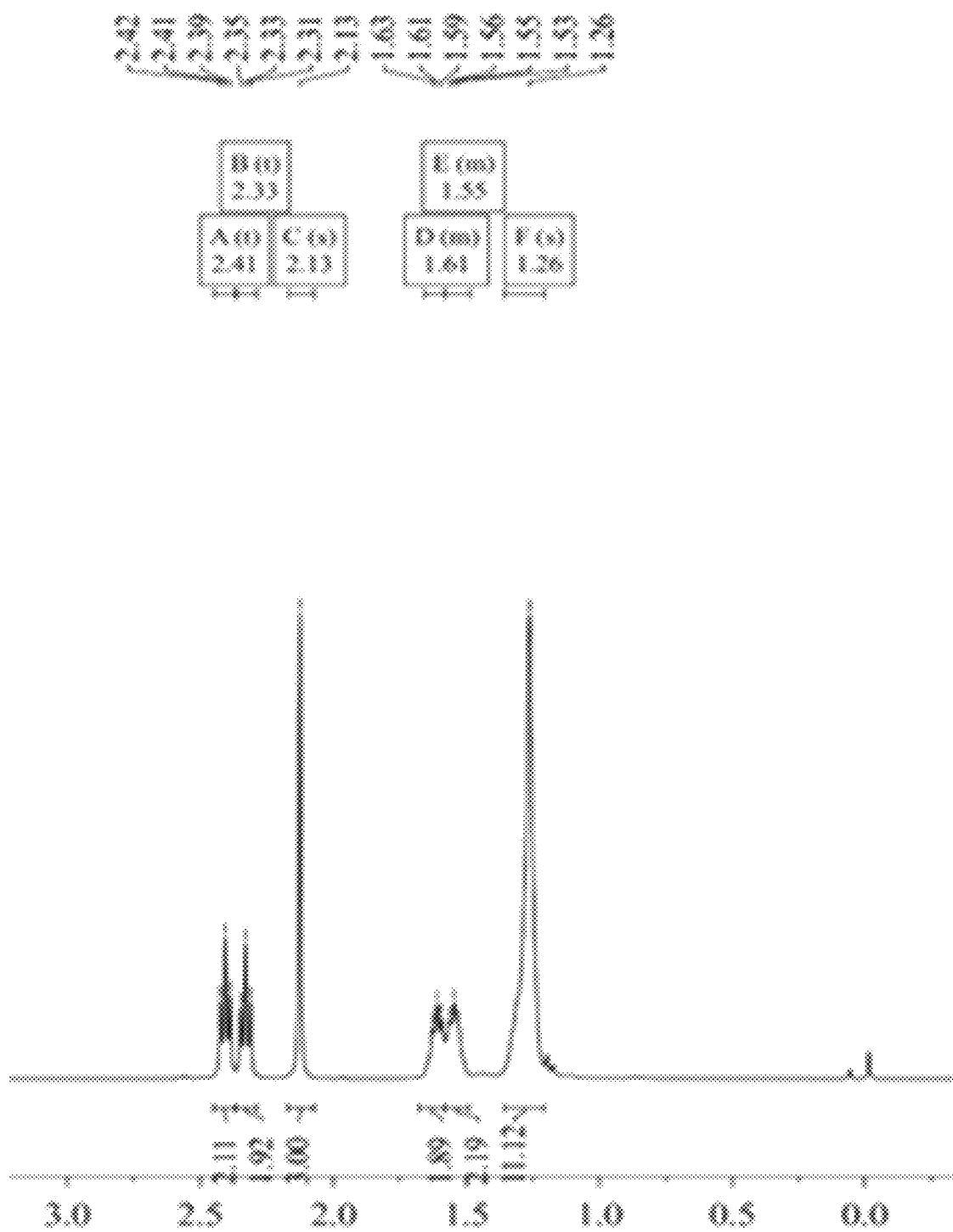
Figure 7A:
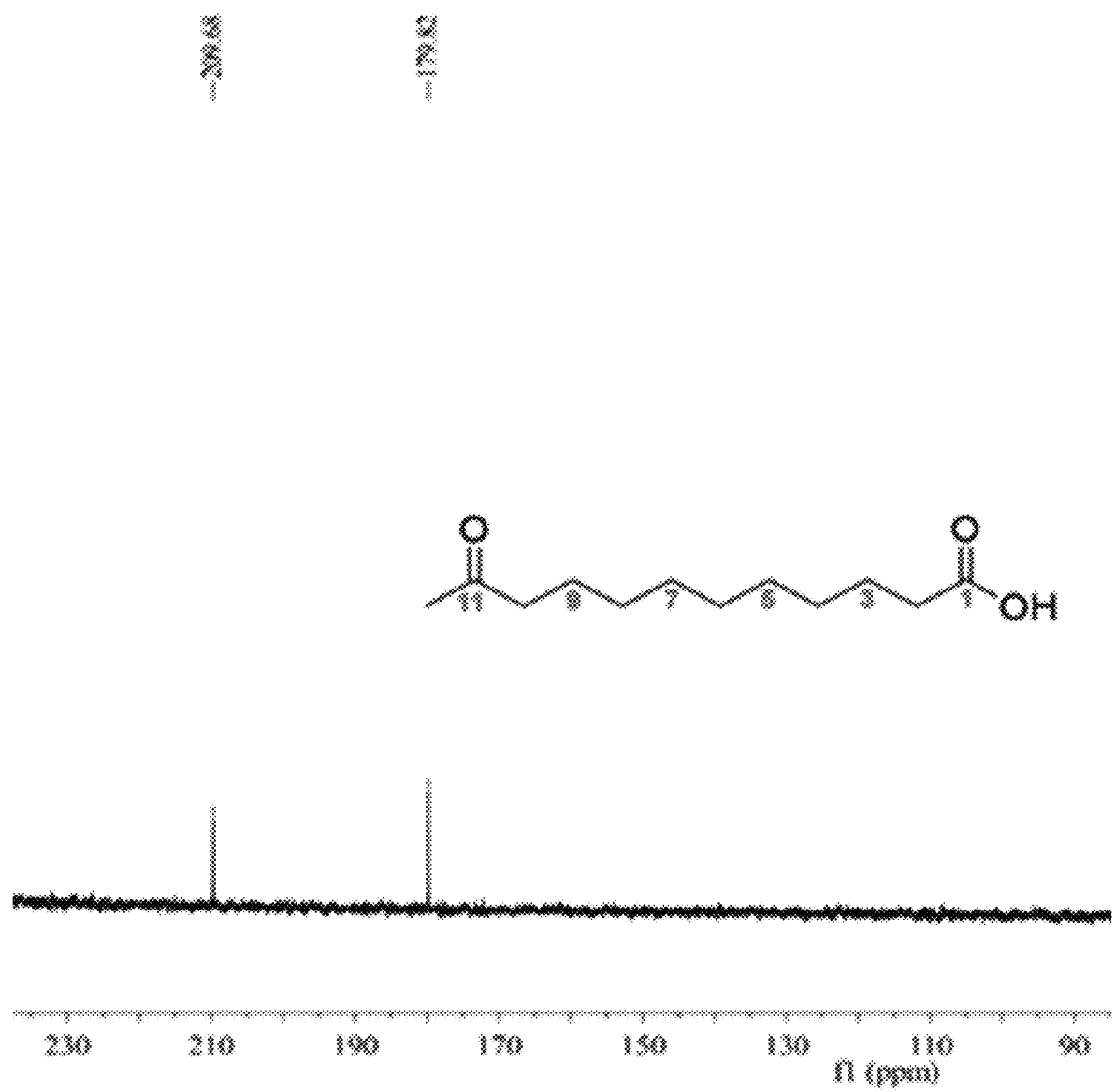
FIG. 7A and FIG. 7B depict graphs of the $^{13}$C NMR spectra of 11-oxo-dodecanoic acid.
Figure 7B:
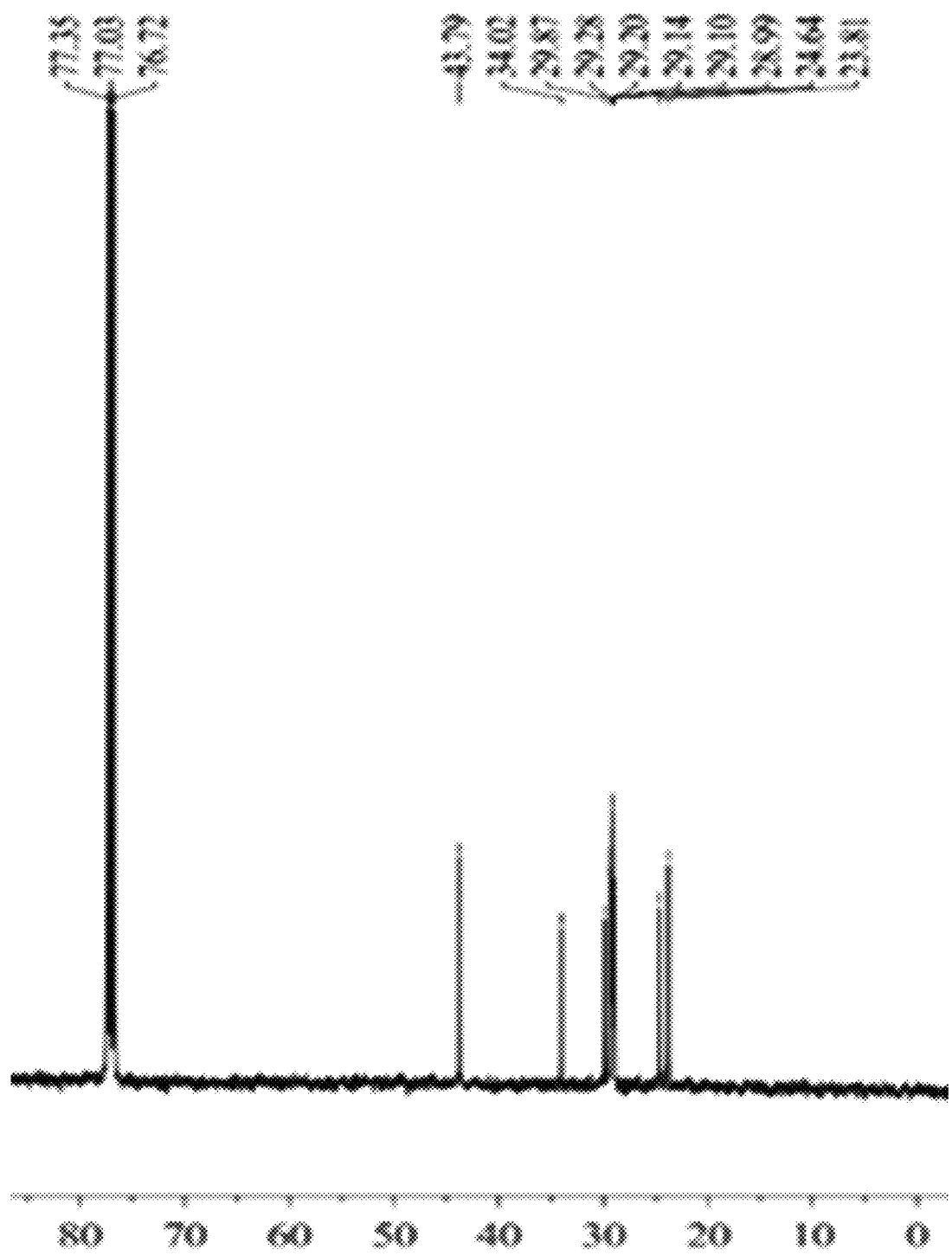
Figure 8:
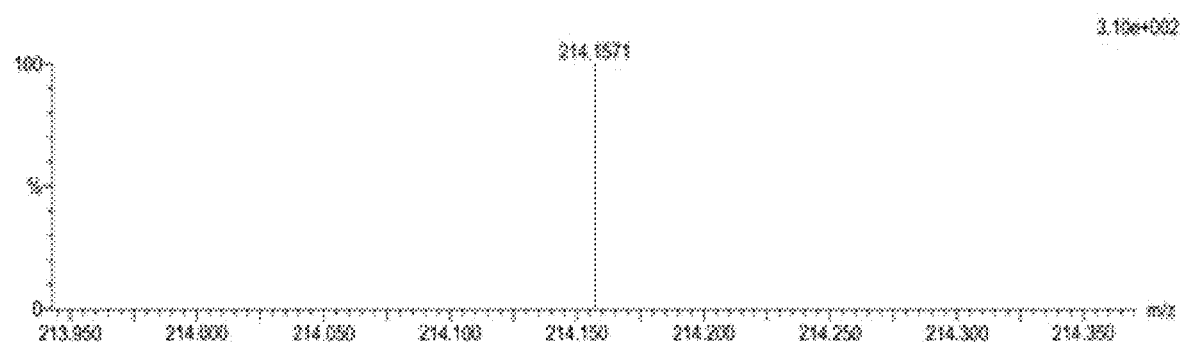
FIG. 8 depicts a graph of the HHY1 HR-MS of 11-oxo-dodecanoic acid (HR-MS (ESI): m/z calculated for $C_{12}H_{22}O_3$: 214.1569; found: 214.1571).

11-oxo-dodecanoic acid was prepared following a reported protocol (Azerad, R., et al., 1990, "High-performance liquid chromatographic separation of 11-hydroxylauric acid enantiomers: Application to the determination of the stereochemistry of microsomal lauric acid (ω-1) hydroxylation," J. Chromatogr. A 498: 293-302), A schematic diagram of the reaction used to prepare 11-oxo-decanoic acid is shown in FIG. 5. Under the protection of argon, 2.2 g dodecanedioic acid (10 mmol) and 80 ml tetrahydrofuran were added into a 100 ml three-necked flask. The mixture was slowly cooled to −70° C. in a refrigerator and 25 ml of methyl lithium (1.6 M diethyl ether solution) was then added dropwise in 1.5 hours. The mixture was stirred at −50° C. for 30 minutes and then at room temperature for another 2 hours. After which, the reaction was quenched with water and the mixture was extracted twice with 100 ml ethyl acetate. The organic layer was washed with water once, dried with anhydrous sodium sulfate, filtered under reduced pressure, and the filtrate was concentrated to gum. The product was purified by silica gel column (petroleum ether: ethyl acetate:methanol=150:10:1-50:10:1) to get an oil in 43% yield. The $^1$H NMR spectra of 11-oxo-dodecanoic acid is shown in FIG. 6 (400 MHz, CDCl$_3$), δ 2.41 (t, J=7.4 Hz, 2H), 2.33 (t, J=7.5 Hz, 2H), 2.13 (s, 3H), 1.60 (m, 2H), 1.55 (m, 2H), 1.26 (s, 10H)). The $^{13}$C NMR spectra of 11-oxo-dodecanoic acid is shown in FIG. 7 ($^{13}$C NMR (101 MHz, CDCl$_3$) δ 209.68, 179.82, 43.79, 34.02, 29.87, 29.28, 29.20, 29.14, 29.10, 28.99, 24.64, 23.81). The HHY1 HR-MS of 11-oxo-dodecanoic acid is shown in FIG. 8 (HR-MS (ESI): m/z calculated for $C_{12}H_{22}O_3$: 214.1569; found: 214.1571). Tolerance=10.0 mDa/DBE: min=−1.5, max=50. Element prediction Off. Monoisotopic Mass, Odd and Even Electron Ions. 26 formula(e) evaluated with 1 results within limits (up to 70 best isotopic matches for each mass). Elements used: C 0-50; H: 0-100; O: 0-10.

The results obtained in this example show that 10-oxo-dodecanoic acid and 11-oxo-dodecanoic acid may be synthetically synthesized to be used as fire ant baits.

EXAMPLE 3

Bioassays

The ability of the oxo acids prepared in Example 2 to attract fire ants was evaluated using an attraction bioassay or a feeding bioassay.

Attraction bioassay: The attraction of individual 10-oxo- and 11-oxo-fatty acids, and a mixture of both oxo fatty acids to worker fire ants was evaluated using a paired two choice bioassay. Two 2-ml centrifuge tubes were used, one with 20 µl oxo fatty acid acetone solution was used as a treatment and the other with 20 µl acetone as a control. The tested concentration for the individual compounds was 2.029 mg/ml for 10-oxo-dodecanoic acid and 1.96 mg/ml for 11-oxo-dodecanoic acid. For the mixture (38.28% 10-oxo-dodecanoic acid and 61.72% 11-oxo-dodecanoic acid), two concentrations (1.98 and 0.198 mg/ml) were tested. The tubes ware placed in the fume hood to let acetone evaporate. There were two different setups for the bioassay: (1) for the individual oxo acids, two tubes were placed inside the tray that hosts the ant colony (host tray), and (2) for the mixture, two tubes were placed in a separated tray that was connected to the host tray using a bridge (foraging tray). After 1 hour, each tube was capped and placed in a refrigerator at $-40°$ C. for 10 minutes and ants inside the tubes were counted. There were 10 replicates for each concentration, and a different colony was used for each replicate. The difference in ant numbers between treatment and control tubes was used to evaluate the attraction of the oxo acid to fire ants. A paired t test was used in data statistical analysis.

Feeding bioassay: This was also a paired two-choice bioassay. Soybean oil was used as a food source for the test (Great Value, purchased from Walmart in Greenville, Mississippi.). Individual 10-oxo- and 11-oxo-fatty acids, and their mixture were tested. The feeding apparatus was a filtered 1-ml pipette tip with the part 0.5 cm below the filter removed. Seventy microliter soybean oil was loaded onto the filter. In the treatment, soybean oil treated with oxo fatty acid was used, and in the control untreated soybean oil was used. The tested concentration for individual compound was 1.90 µg/mg for 10-oxo-dodecanoic acid and 7.273 µg/mg for 11-oxo-dodecanoic acid. The mixture (38.12% 10-oxo-dodecanoic acid and 61.88% 11-oxo-dodecanoic acid) was tested at 0.36 µg/mg. The weight of each tip with oil was recorded. The bioassay started 20 minutes after the oil was loaded. There were also two placements for the food: (1) for the individual oxo acids, two tips were placed inside a host tray, and (2) for the mixture, two tips were placed in the foraging tray. After 24 hours, each tip was collected, placed in a refrigerator at $-40°$ C. for 10 minutes to kill the ants. After all the ants were removed from the tip, the weight of the tip was recorded. There were 10 replicates for the individual oxo acid bioassays and three replicates for the mixture. A different colony was used for each replicate. The difference in oil consumption between treatment and control tubes was used to evaluate whether the oxo fatty acid facilitated ants to feed the treated soybean oil. A paired t test was used in data statistical analysis.

Figure 9:
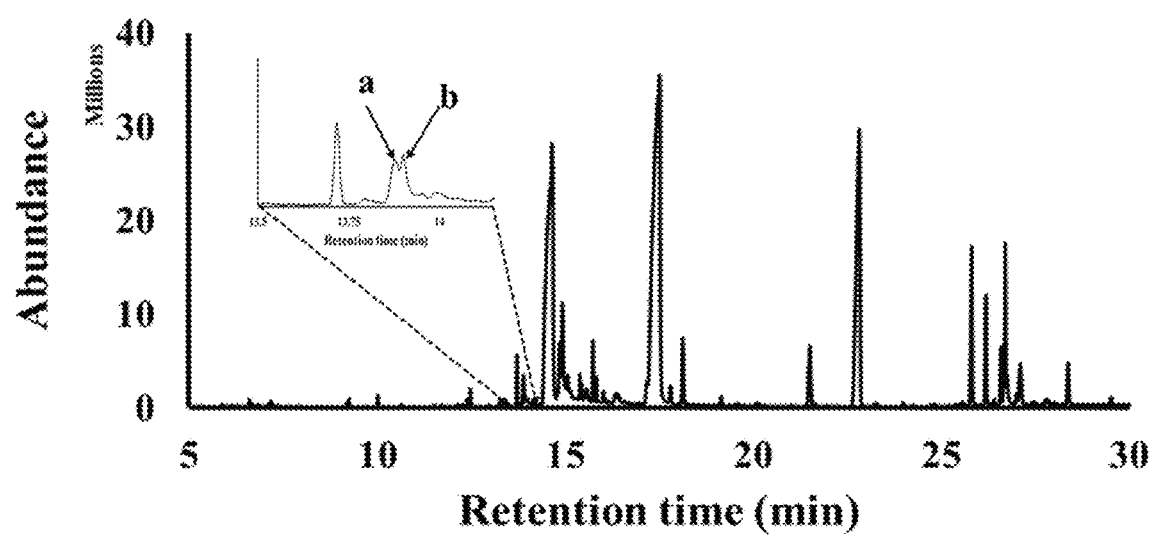
FIG. 9 depicts a graphs of the total ion chromatogram of dichloromethane extract of male alate reproductive system as described herein. Peak assignment: a. 10-oxo-dodecanoic acid, b. 11-oxo-dodecanoic acid.
Figure 10A:
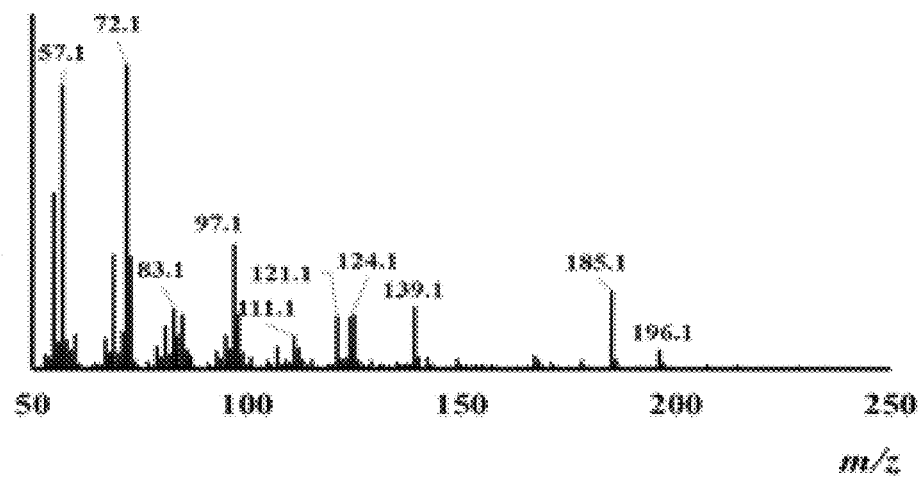
FIG. 10A and FIG. 10B depict graphs of the mass spectra of 10-oxo-fatty acids and its synthetic standard.
Figure 10B:
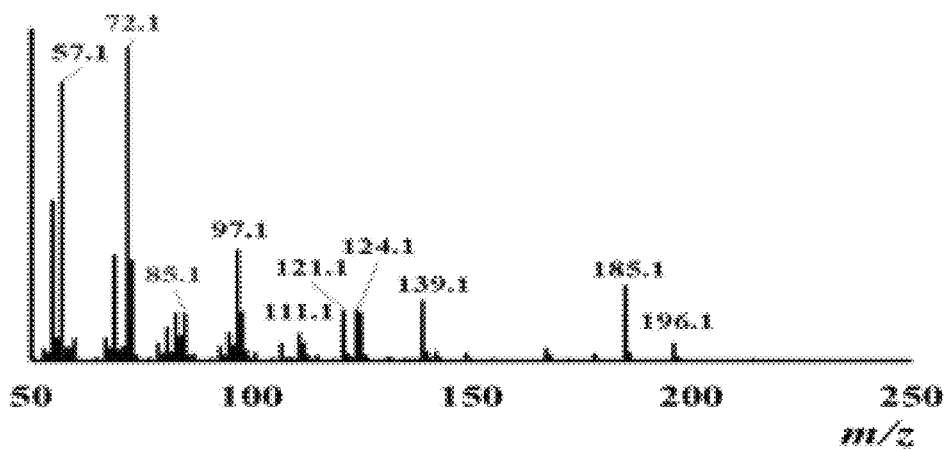
Figure 11A:
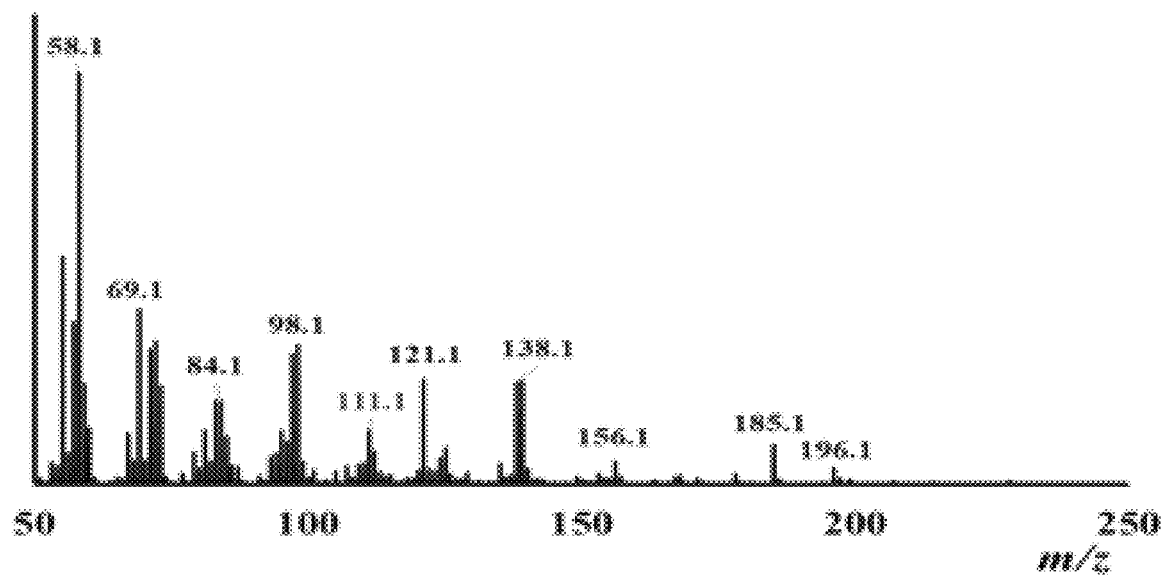
FIG. 11A and FIG. 11B depict graphs of the mass spectra of 11-oxo-fatty acids and its synthetic standard.
Figure 11B:
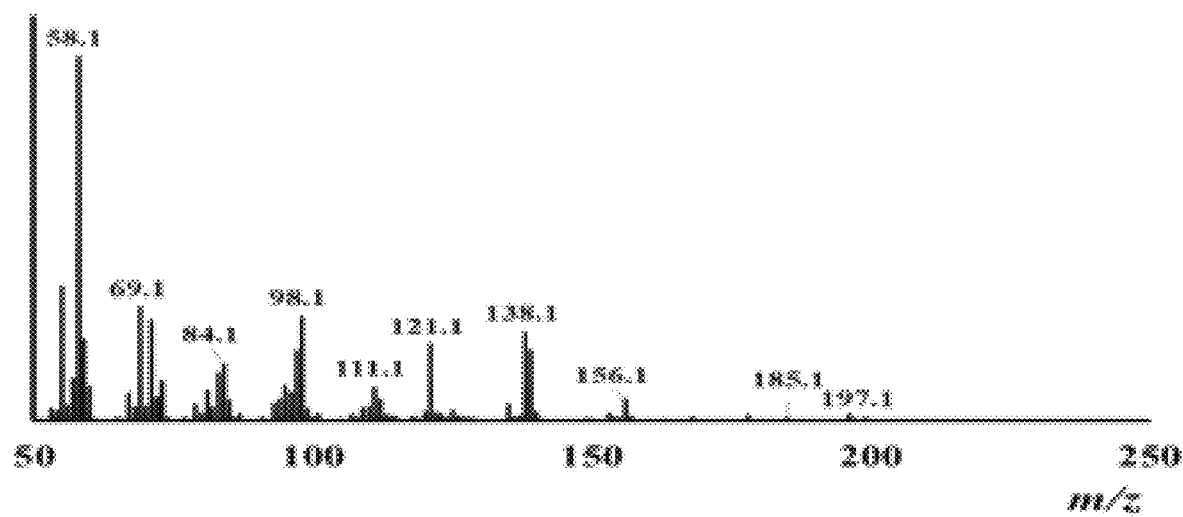
Figure 12:
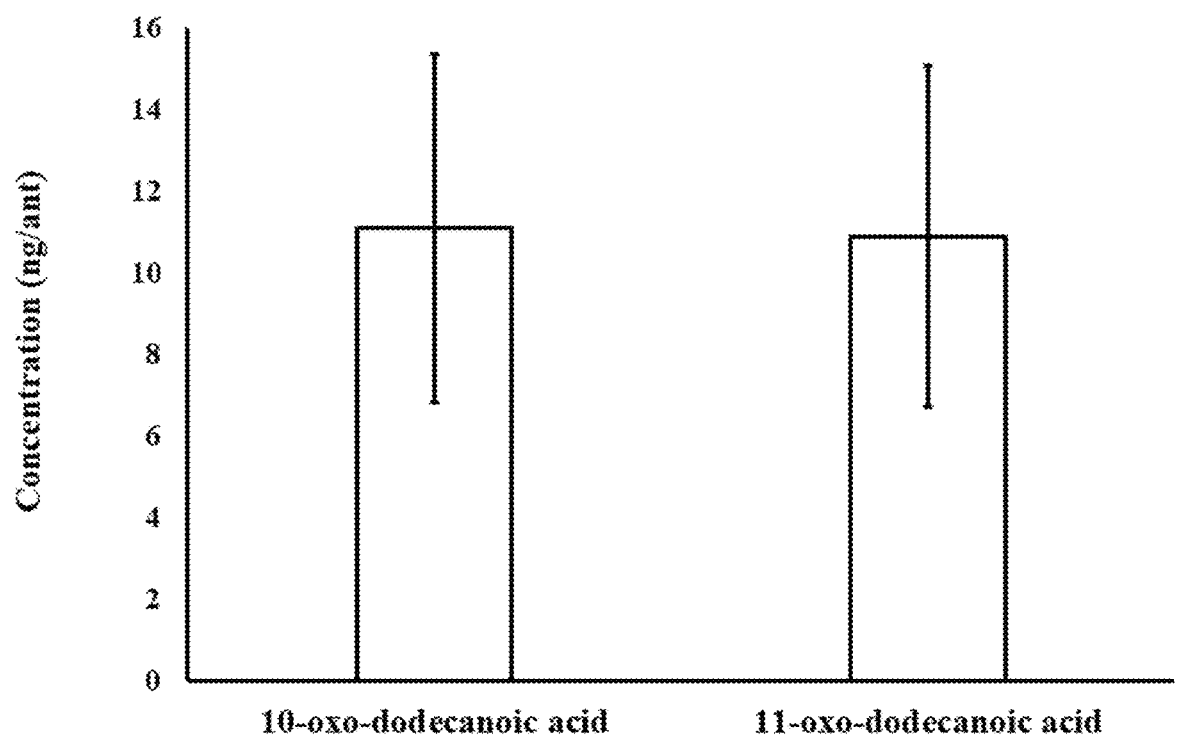
FIG. 12 depicts a graph of the quantity of 10-oxo- and 11-oxo-fatty acids in individual male alates (mean±SE, n=12). The Y axis presents the concentration of fatty acid per ant (ng/ant). The X axis presents the compound.

Results. Identification and quantification of oxo fatty acids: For past few decades, the inventors have analyzed a great number of *S. invicta* samples. 10-oxo- and 11-oxo-dodecanoic acids appear to occur only in the reproductive system of the male alates. The chromatogram showing two oxo fatty acid peaks is shown in FIG. 9. The mass spectra for 10-oxo fatty acid in ants is shown in FIG. 10A, and that of its synthetic standard is shown in FIG. 10B. The mass spectra for 11-oxo fatty acid in ants is shown in FIG. 11A, and that of its synthetic standard is shown in FIG. 11B. As seen on FIG. 12, the concentration of 10-oxo-dodecanoic acid was 11.09±4.26 ng/ant (mean±SE, n=12) and the concentration of 11-oxo-dodecanoic acid was 10.90±4.18 ng/ant.

Figure 13:
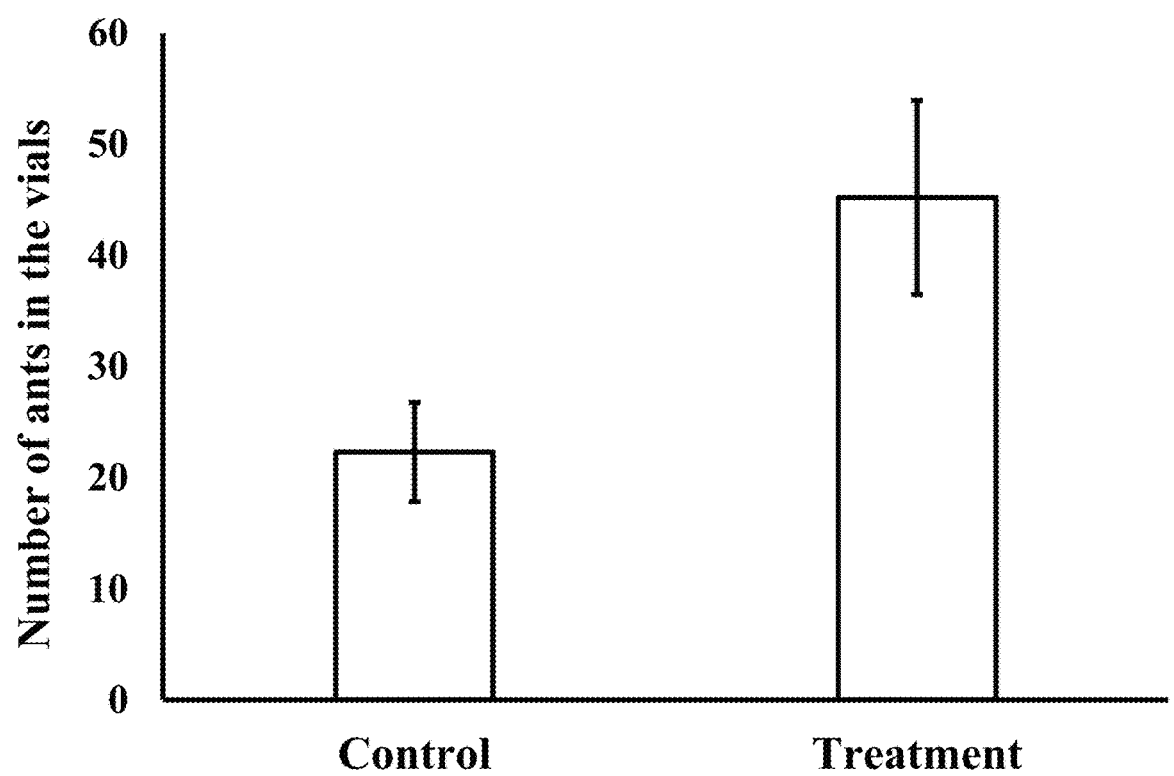
FIG. 13 depicts a graph of the number or ants attracted to 10-oxo-fatty acid or control.
Figure 14:
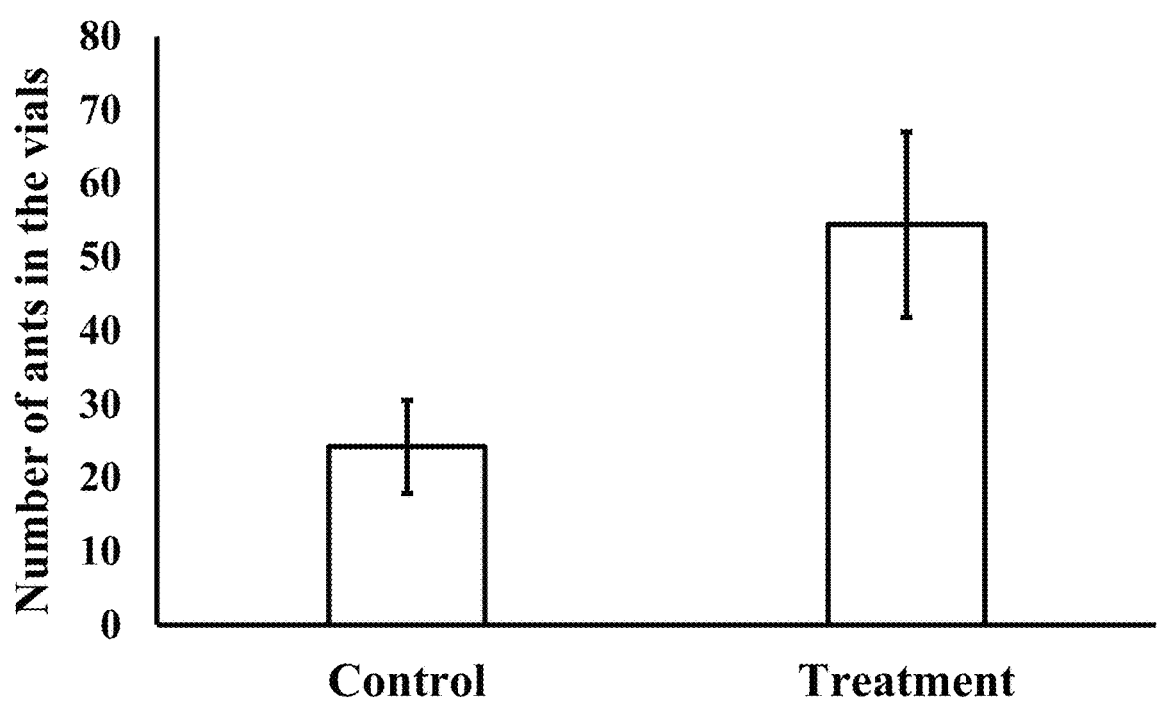
FIG. 14 depicts a graph of the number of ants attracted 11-oxo-dodecanoic acid or control.
Figure 15A:
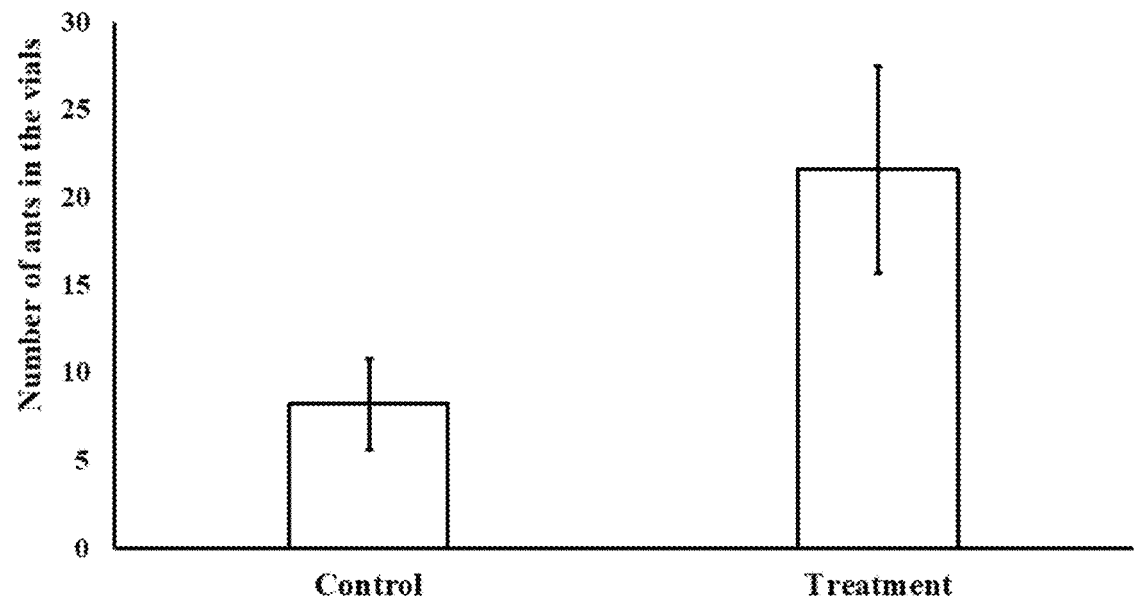
FIG. 15A and FIG. 15B depict graphs of the number of ants attracted by mixtures of 10-oxo-dodecanoic acid and 11-oxo-dodecanoic acid.
Figure 15B:
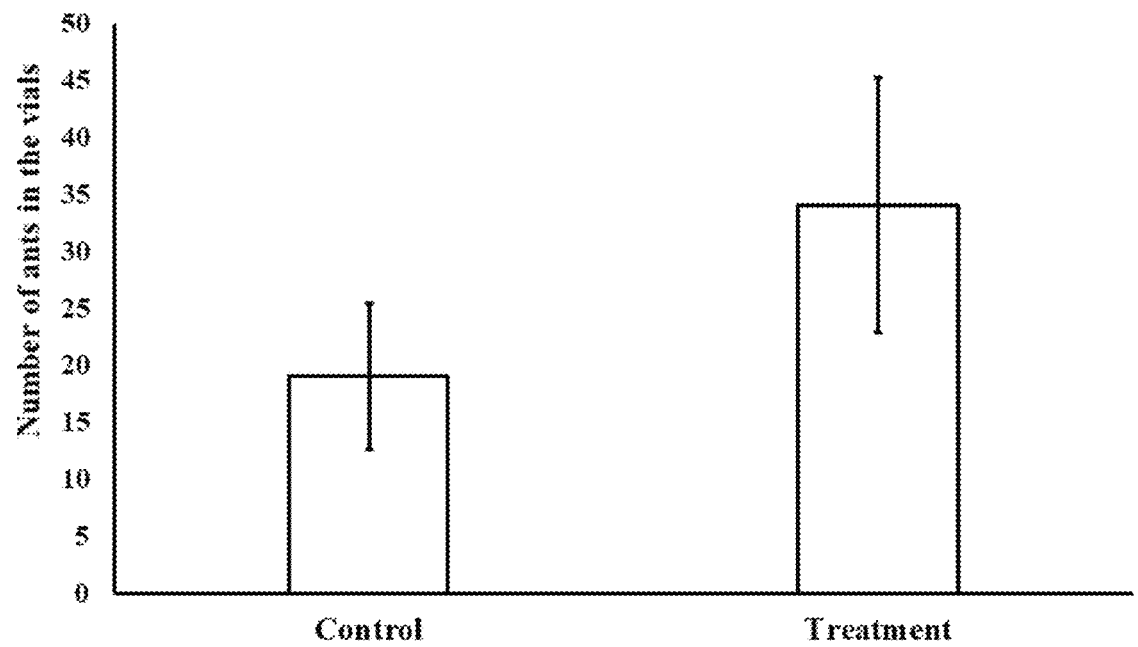

Attraction bioassay: Both oxo acids exhibited attraction to fire ant workers. Significantly more ants were found in the vials treated with individual oxo fatty acids or their mixture than in the vials treated with only acetone control. The result of the attraction bioassay with 10-oxo-dodecanoic acid is shown in FIG. 13. The difference in the number of ants between treatment vials and control vials was significant (t=$-4.74$, P=0.001). The result of the attraction bioassay with 11-oxo-dodecanoic acid is shown in FIG. 14. A significant difference in the number of ants was also found for 11-oxo-dodecanoic acid (t=$-4.36$, P=0.0018). For the mixture, as seen in FIG. 15A and FIG. 15B, a significant difference was found for both tested concentrations (at 1.98 mg/ml: t=$-3.66$, P=0.005; at 0.198 mg/ml: t=$-2.82$, P=0.02).

Figure 16:
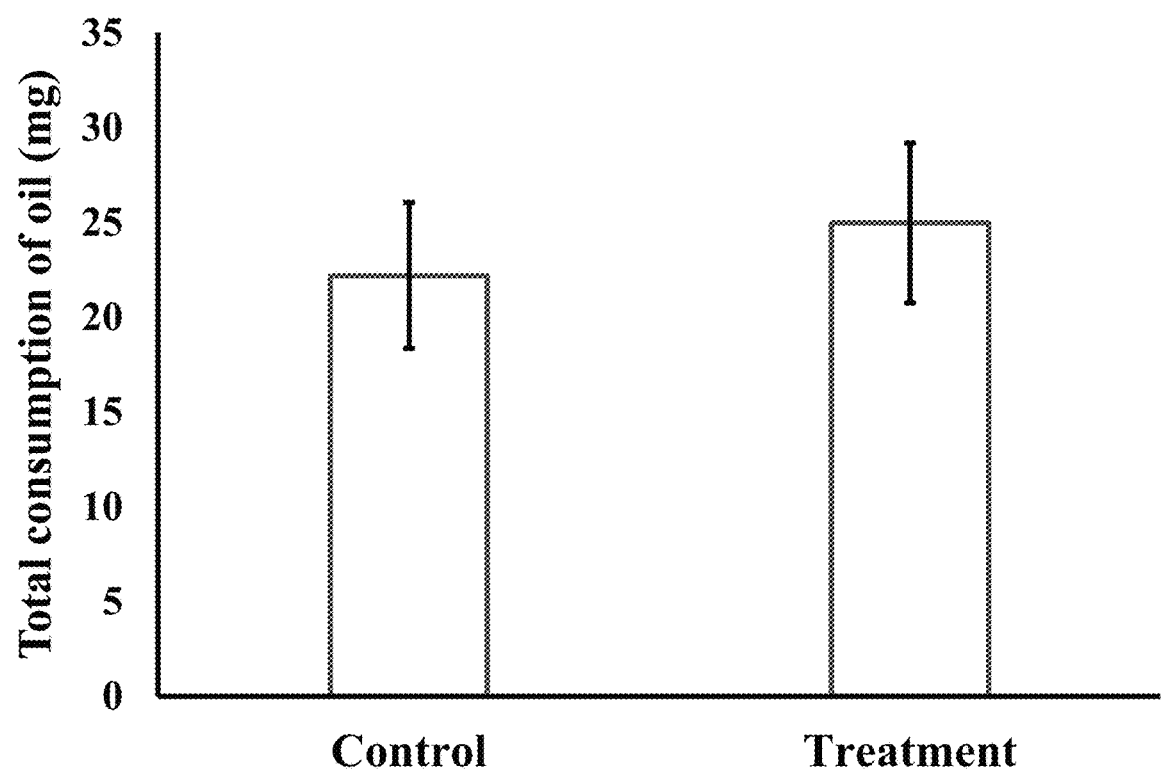
FIG. 16 depicts a graph of the total consumption of oil containing 1.90 µg/mg 10-oxo-dodecanoic acid or untreated soybean oil (paired t test, t=−2.30, P=0.047).
Figure 17:
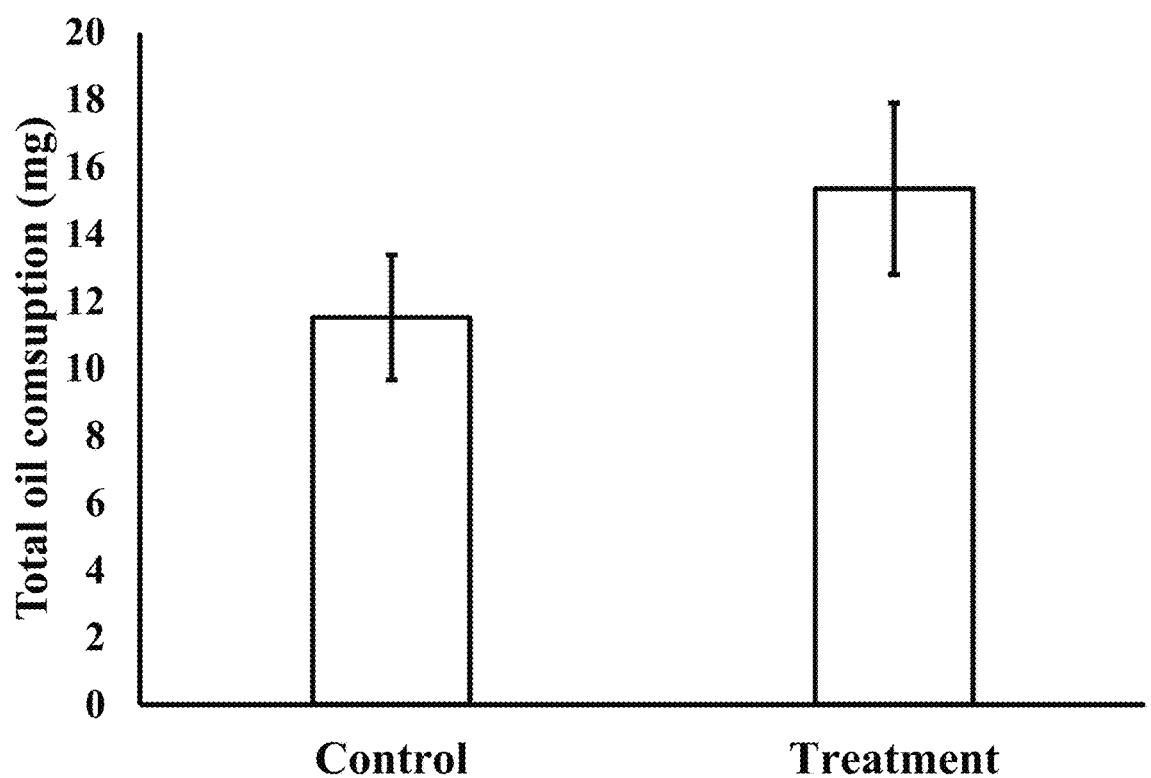
FIG. 17 depicts a graph of the total consumption of oil containing 7.27 µg/mg 11-oxo-dodecanoic acid or untreated soybean oil (paired t test, t=−2.46, P=0.028).
Figure 18:
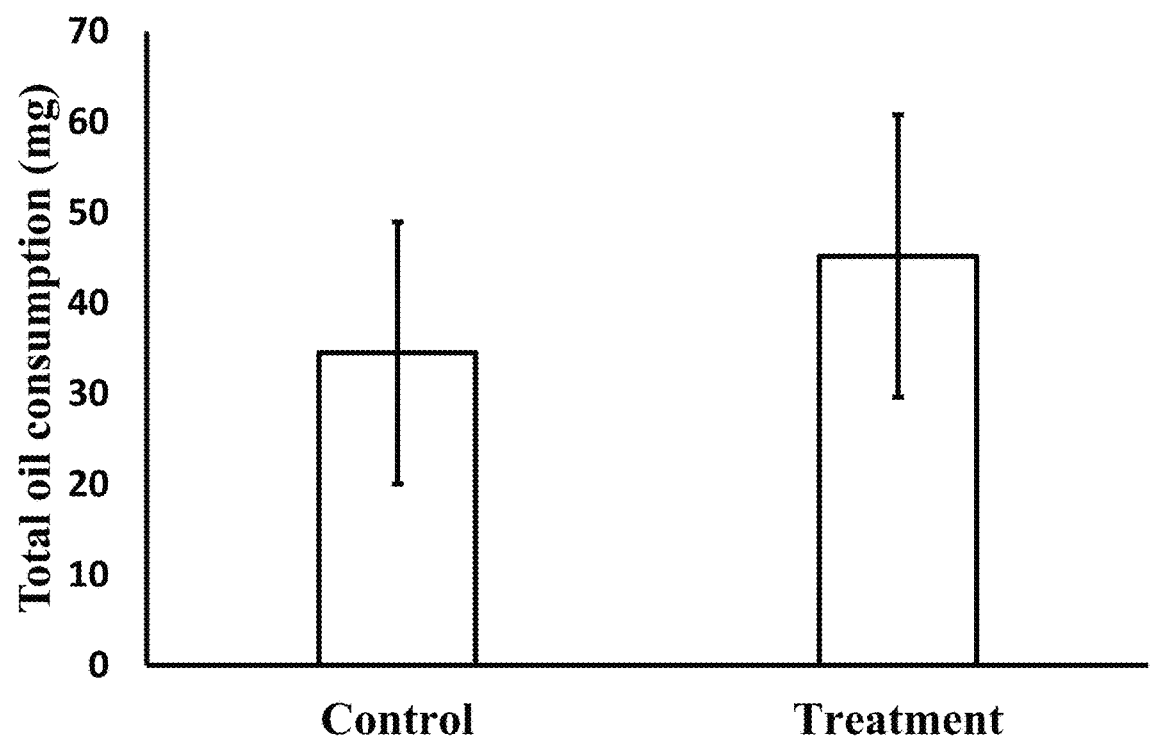
FIG. 18 depicts a graph of the total consumption of oil containing a mixture of 10-oxo-dodecanoic acid and 11-oxo-dodecanoic acid or untreated soybean oil (paired t test, t=−2.46, P=0.028).

Feeding bioassay: Ants fed preferentially on soybean oil treated with individual oxo fatty acids or their mixture over untreated soybean oil. The result of a feeding bioassay with 10-oxo-dodecanoic acid is shown in FIG. 16. The difference in oil consumption between treatment and control was significant (t=$-2.3$, P=0.047). As seen in FIG. 17, a significant difference in oil consumption between treatment and control was also found for 11-oxo-dodecanoic acid (t=$-2.46$, P=0.028), and as seen in FIG. 18, when using the mixture (t=$-2.82$, P=0.02).

The results obtained in this example show that 10-oxo-dodecanoic acid and 11-oxo-dodecanoic acid appear to occur only in the reproductive system of the male fire ant alates.

EXAMPLE 4

Effect of Different 10-Oxo- and 11-Oxo-Dodecanoic Acid Concentrations

The feeding preference for 10-oxo decanoic acid and 11-oxo-dodecanoic acid at different concentrations in soybean oil were tested. Eight concentrations of 10-oxo-dodecanoic acid and 11-oxo-dodecanoic acid were tested in the field using multiple choice bioassays.

Figure 19:
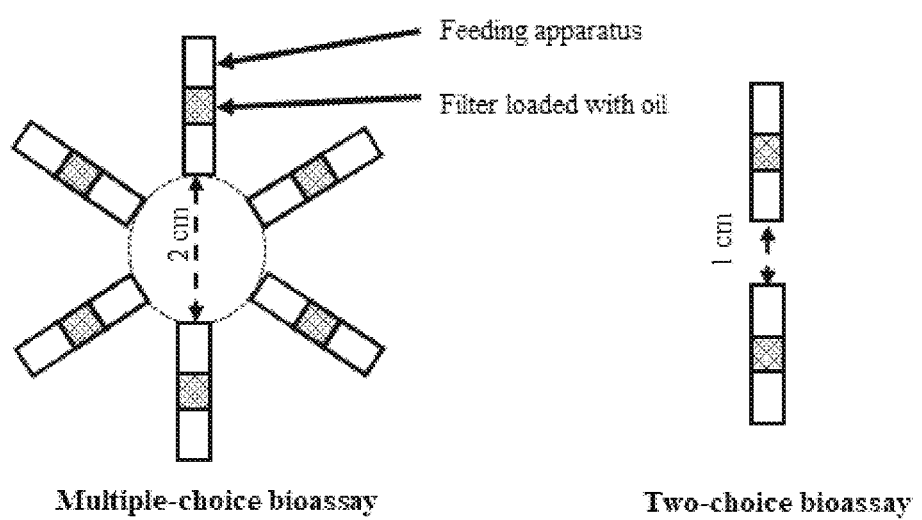
FIG. 19 depicts a schematic of the field feeding bioassay setups. Left side, multiple-choice bioassay set up. Right side, two-choice bioassay set up.

Multiple-choice and a paired two-choice bioassays were used in this study. A schematic representation of the bioassay set-ups is depicted in FIG. 19. Soybean oil was used as a food source for all the bioassays (Great Value, purchased from Walmart in Greenville Mississippi). The feeding apparatus was a filtered 1-ml pipette tip with the part 0.5 cm below the filter removed. In multiple-choice bioassays, four to six concentrations of tested compounds were tested with untreated soybean oil as a control, and in two-choice bioassays, the compound at certain concentration was tested against the control oil or oil treated with known fire ant attractant. Eighty microliter soybean oil was loaded onto each filter. After being weighed, the apparatuses with oil were placed in the field for about 2 hours. The apparatuses were then collected and frozen under $-40°$ C. to kill all ants. The apparatuses were weighed again after all ants were removed from the apparatuses. The difference in the weight of apparatuses before and after the feeding bioassays was the oil consumption. There were six to 10 replicates for each bioassay. Feeding sites were at least 10 m away from each other. The difference in oil consumption among/between treatment and control apparatuses was used to evaluate the effect of tested compound on the feeding of fire ants. For multiple-choice bioassays, a one-way ANOVA was performed to compare the effect of different concentrations of tested compound on the percentage of oil consumption. Tukey's HSD test was used for multiple comparisons. A paired t test was used in statistical analysis for the two-choice bioassays.

For each fatty acid, eight concentrations were tested in two separate multiple-choice bioassays. For 10-oxo-dodecnoic acid, the first set used in the multiple-choice bioassay included concentrations of 0.00 mg/g (control), 9.09 mg/g, 4.54 mg/g, 2.27 mg/g, and 1.14 mg/g, and the second set included 0.00 mg/g, 0.51 mg/g, 0.28 mg/g, 0.142 mg/g, and 0.07 mg/g. There were seven replicates for each set of bioassay. For 11-oxo-dodecnoic acid, the first set used in the multiple-choice bioassay included concentrations of 0.00 mg/g, 8.62 mg/g, 4.31 mg/g, 2.15 mg/g, and 1.08 mg/g, and the second set included 0.00 mg/g, 0.54 mg/g, 0.27 mg/g, 0.14 mg/g, and 0.07 mg/g. There were six replicates for the first set of bioassay and seven replicates for the second set of bioassay.

Figure 20A:
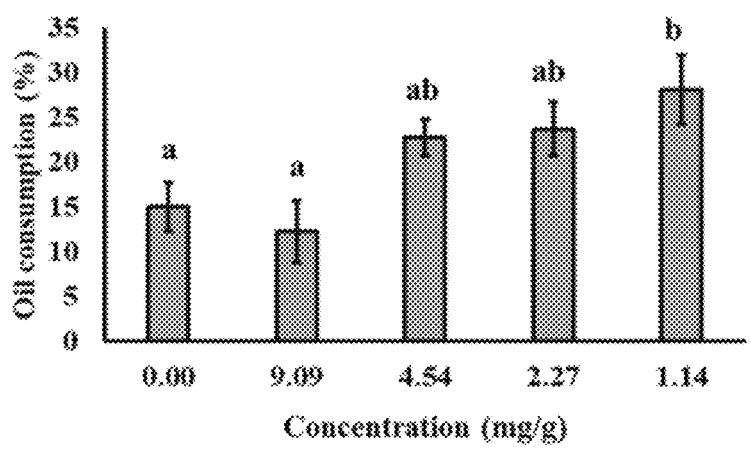
FIG. 20A and FIG. 20B depict graphs of the fire ant consumption of soybean oil containing different 10-oxo-dodecanoic acid concentrations in multiple choice bioassays.
Figure 20B:
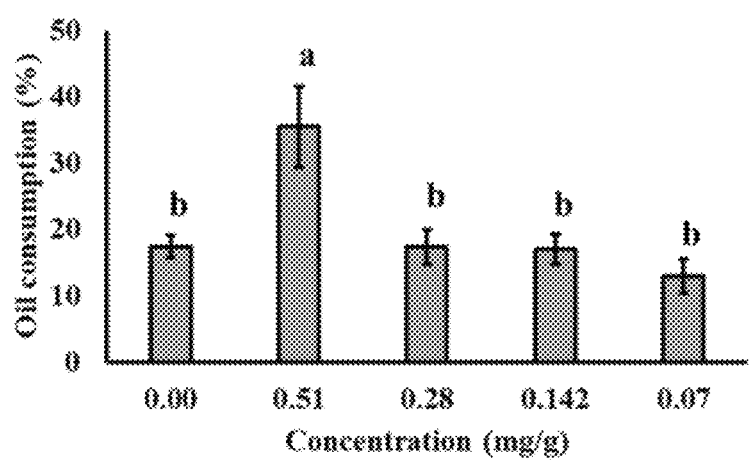

The results when using 10-oxo-dodecanoic acid are shown in FIG. 20A and FIG. 20B. Mean oil consumption percentages (%) of each choice over the total oil consumption were used in one-way ANOVA analysis. The means with different letters were significantly different. FIG. 20A shows the results from the first multiple-choice bioassay with 10-oxo-dodecanoic acid at 0.00 mg/g, 9.09 mg/g, 4.54 mg/g, 2.27 mg/g, and 1.14 mg/g concentrations. FIG. 20B shows the results from the second multiple-choice bioassay with 10-oxo-dodecanoic acid at 0.00 mg/g, 0.51 mg/g, 0.28 mg/g, 0.142 mg/g, and 0.07 mg/g. In the first multiple-choice bioassay (shown in FIG. 20A), different concentrations of 10-oxo-dodecanoic acid had significant effect on oil consumption; however, the effect was only statistically significant at 1.14 mg/g when compared to the control oil (df=4, F=4.5, P=0.0058). In the second multiple-choice bioassay (shown in FIG. 20B), 10-oxo-dodecanoic also had significant effect on oil consumption; however, the effect was statistically significant only at 0.51 mg/g when compared to the control oil (df=4, F=6.64, P=0.0006).

Figure 21A:
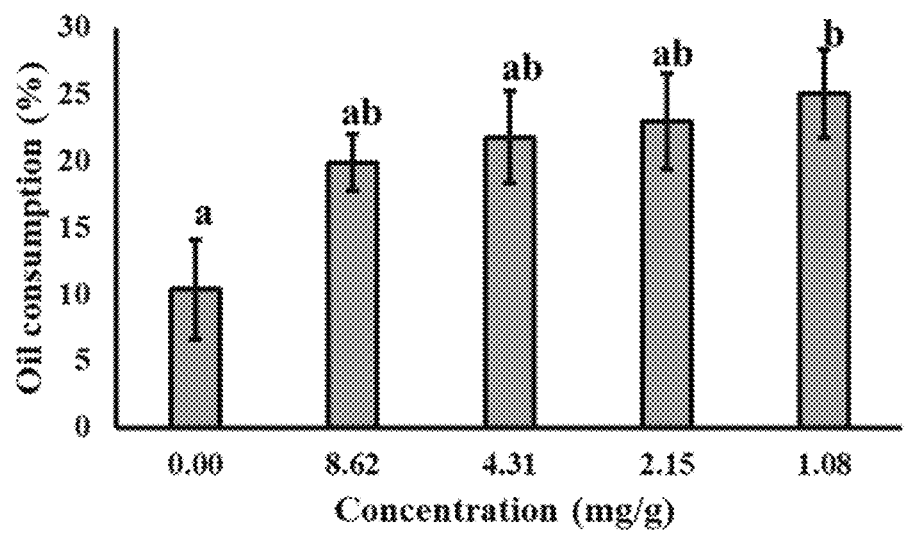
FIG. 21A and FIG. 21B depict graphs of the fire ant consumption of soybean oil containing different 11-oxo-dodecanoic acid concentrations in multiple choice bioassays.
Figure 21B:
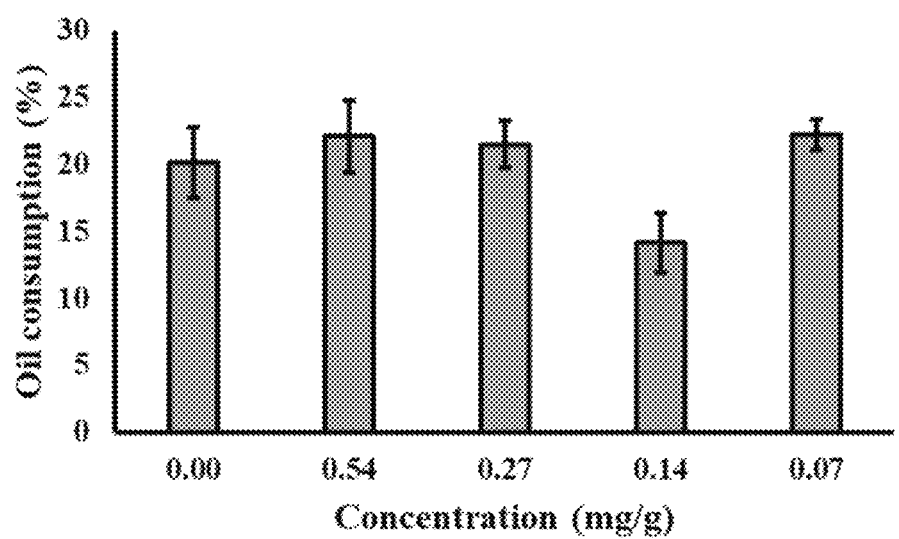

The results when using 11-oxo-dodecanoic acid are shown in FIG. 21A and FIG. 21B. In the first multiple-choice bioassay (shown in FIG. 21A), different concentrations of 11-oxo-dodecanoic had significant effect on oil consumption; however, the effect was statistically significant only at 1.08 mg/g compared to the control oil (df=4, F=3.00, P=0.0038). In the second multiple-choice bioassay (shown in FIG. 21B), 11-oxo-dodecanoic acid had no significant effect on oil consumption (df=4, F=2.43, P=0.07).

EXAMPLE 5

Effect of Oxo-Fatty Acid Analogs

The feeding preference for different oxo-fatty acids in soybean oil were determined. Five oxo fatty acid analogs were tested in the filed using multiple-choice/two-choice bioassays, including 8-oxo-decanoic acid, 9-oxo-2-decenoic acid, 9-oxo-decanoic acid, 11-oxo-tridecanoic acid, and 12-oxo-tetradecanoic acid.

Five oxo fatty acid analogs were tested in the filed using two-choice or multiple-choice bioassays. Tested were 8-oxo-decanoic acid, 9-oxo-2-decenoic acid, 9-oxo-decanoic acid, 11-oxo-tridecanoic acid, and 12-oxo-tetradecanoic acid. Eight oxo-decanoic acid was tested in a multiple-choice bioassay at 6 different concentrations including 0.00 mg/g, 0.81 mg/g, 0.41 mg/g, 0.20 mg/g, 0.10 mg/g, and 0.05 mg/g. There were 10 replicates for the bioassay. For 9-oxo-2-decenoic acid, a two-choice bioassay was conducted with each of the following six concentrations: 0.39 mg/g, 0.197 mg/g, 0.098 mg/g, 0.049 mg/g, 0.025 mg/g, and 0.012 mg/g. There were 5 to 7 replicates for each two-choice bioassay. For 9-oxo-decanoic acid, a multiple-choice bioassay was conducted at six concentrations including 0.00 mg/g, 0.124 mg/g, 0.062 mg/g, 0.031 mg/g, 0.016 mg/g, and 0.007 mg/g. There were 11 replicates. For 11-oxo-tridecanoic acid, a multiple-choice bioassay was conducted at five concentrations including 0.00 mg/g, 7.71 mg/g, 3.86 mg/g, 1.93 mg/g, and 0.96 mg/g. There were 6 replicates. For 12-oxo-tetradecanoic acid, a multiple-choice bioassay was conducted at six concentrations including 0.00 mg/g, 1.15 mg/g, 0.58 mg/g, 0.29 mg/g, 0.14 mg/g, and 0.07 mg/g. There were 7 replicates.

Figure 22:
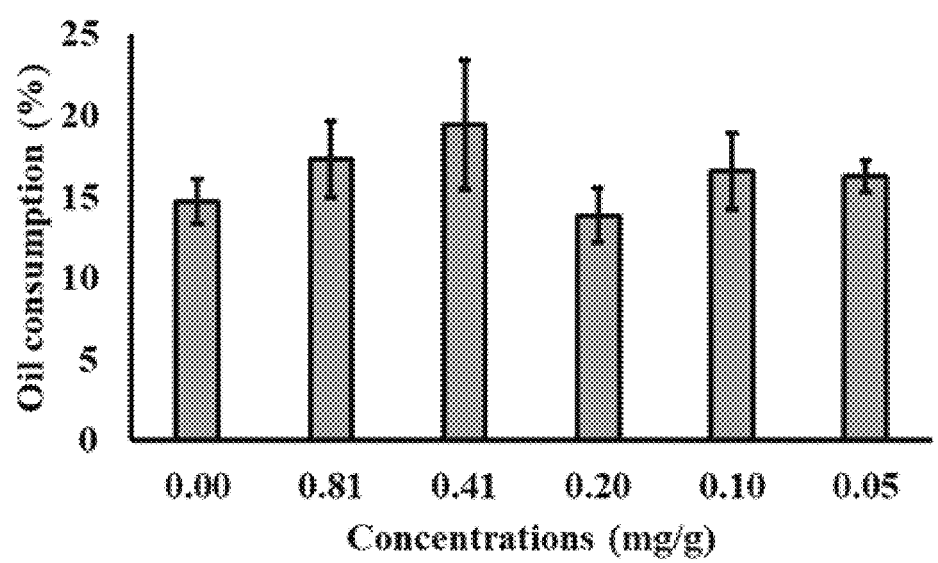
FIG. 22 depicts a graph of the fire ant consumption of soybean oil containing 0.00 mg/g; 0.81 mg/g; 0.41 mg/g; 0.20 mg/g; 0.10 mg/g; or 0.05 mg/g 8-oxo-decanoic acid in multiple-choice bioassays.
Figure 23:
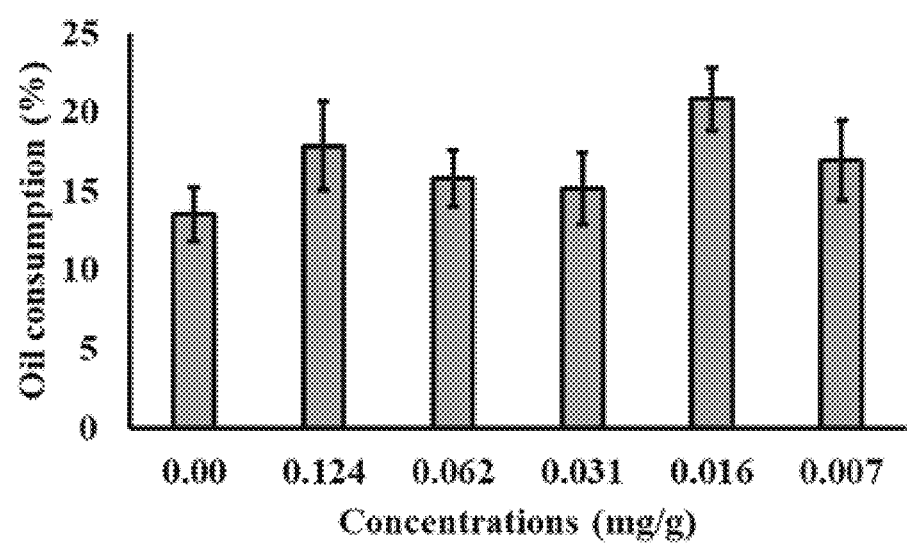
FIG. 23 depicts a graph of the fire ant consumption of soybean oil containing 0.00 mg/g; 0.1241 mg/g; 0.062 mg/g; 0.031 mg/g; 0.016 mg/g; or 0.007 mg/g 9-oxo-decanoic acid in multiple-choice bioassays.
Figure 24:
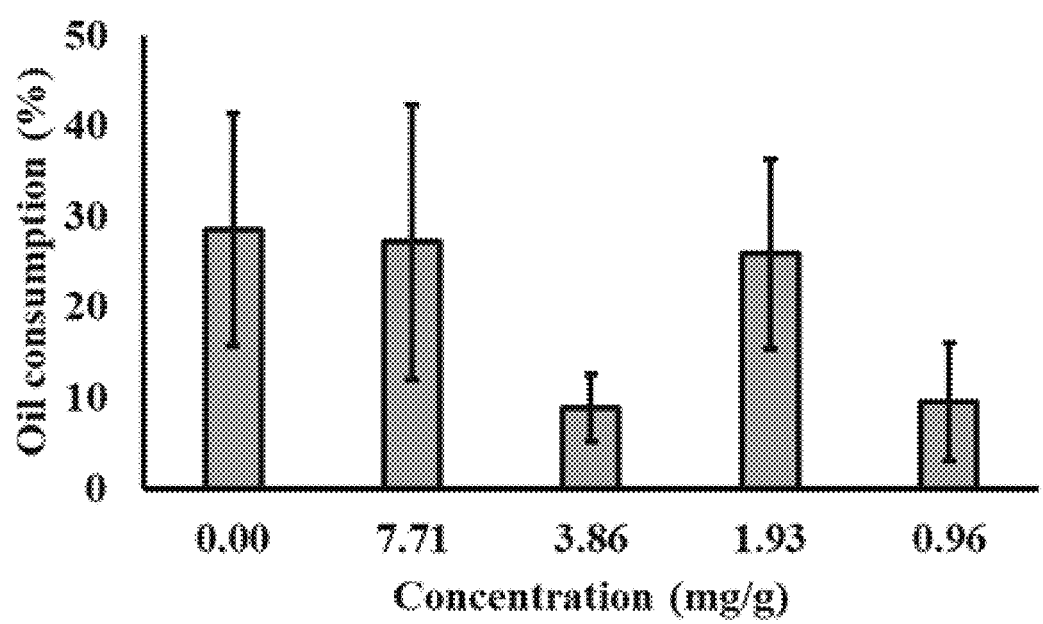
FIG. 24 depicts a graph of the fire ant consumption of soybean oil containing 0.00 mg/g; 7.71 mg/g; 3.86 mg/g; 1.93 mg/g; 0.96 mg/g 11-oxo-tridecanoic acid in multiple-choice bioassays.
Figure 25:
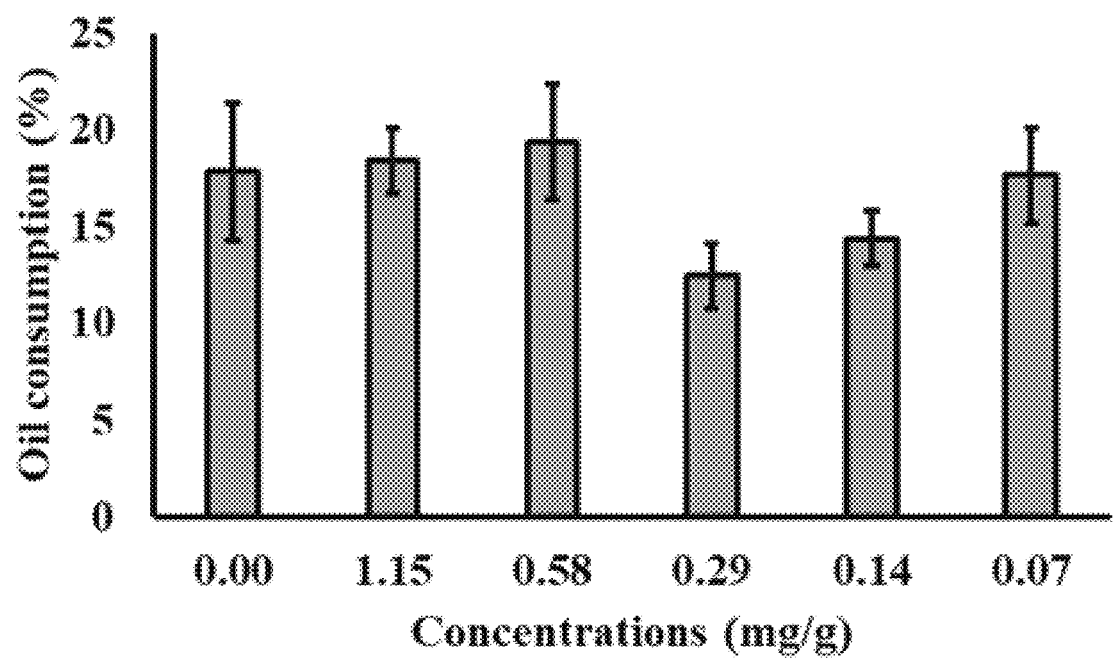
FIG. 25 depicts a graph of the fire ant consumption of soybean oil containing 0.00 mg/g; 1.15 mg/g; 0.58 mg/g; 0.29 mg/g; 014 mg/g; and 0.07 mg/g 12-oxo-tetradecanoic acid in multiple-choice bioassays.
Figure 26:
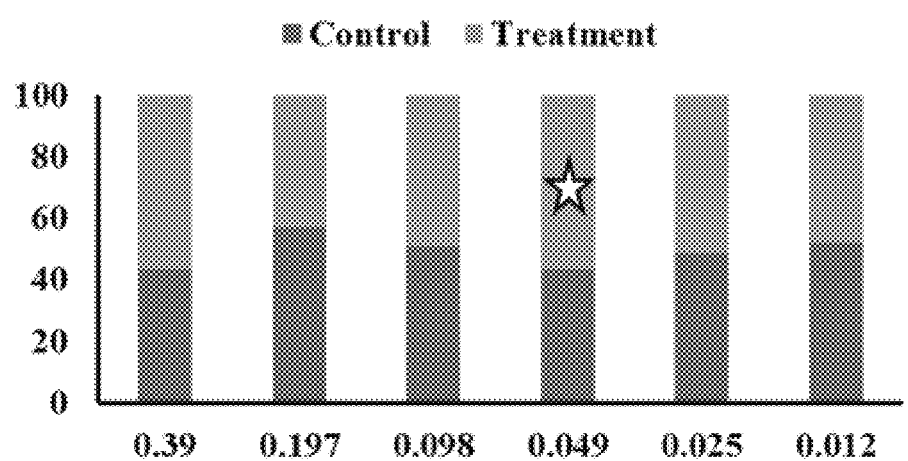
FIG. 26 depicts a graph of the fire ant consumption of soybean oil containing 0.39 mg/g; 0.197 mg/g; 0.098 mg/g; 0.049 mg/g; 0.025 mg/g; and 0.12 mg/g 9-oxo-2-decenoic acid in multiple-choice bioassays.

The results for 8-oxo-decanoic acid are shown in FIG. 22. Mean oil consumption percentages (%) of each choice over the total oil consumption were used in one-way ANOVA analysis. There was no significant difference among treatments and control (df=5, F=0.71, P=0.62). The results for 9-oxo-decanoic acid are shown in FIG. 23. Mean oil consumption percentages (%) of each choice over the total oil consumption were used in one-way ANOVA analysis. There was no significant difference among treatments and control (df=5, F=1.29, P=0.28). The results for 11-oxo-tridecanoic acid are shown in FIG. 24. Mean oil consumption percentages (%) of each choice over the total oil consumption were used in one-way ANOVA analysis. There was no significant difference among treatments and control (df=4, F=0.87, P=0.50). The results for 12-oxo-tetradecanoic acid are shown in FIG. 25. Mean oil consumption percentages (%) of each choice over the total oil consumption were used in one-way ANOVA analysis. There was no significant difference among treatments and control (df=5, F=1.22, P=0.32). The results for 9-oxo-2-decenoic acid are shown in FIG. 26. A paired t test was used in data analysis at each concentration. Only 9-oxo-2-decenoic acid at 0.049 mg/g significantly improved the feeding preference of fire ant on soybean oil (df=4, t=3.00, P=0.0038). Table 1 below depicts the results for 9-oxo-2-decenoic acid.

TABLE 1

| 9-oxo-2-decenoic acid results | | | |
|---|---|---|---|
| Concentration (mg/g) | DF | t Value | Pr> |
| 0.39 | 7 | 2.86 | 0.024 |
| 0.197 | 5 | 1.98 | 0.11 |
| 0.098 | 5 | 0.68 | 0.53 |
| 0.049 | 7 | −3.21 | 0.015 |
| 0.025 | 7 | −0.88 | 0.41 |
| 0.012 | 7 | 2.14 | 0.07 |

Except 9-oxo-2-decenoic acid at 0.049 mg/g (df=4, t=3.00, P=0.0038), all other compounds at all tested concentrations did not significantly improve the feeding preference of fire ants on soybean oil.

EXAMPLE 6

Comparison of 10-Oxo-Dodecanoic Acid and 11-Oxo-Dodecanoic Acid to Known Fire Ant Attractants The effect of 10-oxo-dodecanoic acid and 11-oxo-dodecanoic add was compared to that of two known fire ant attractants using two-choice bioassays.

Figure 27:
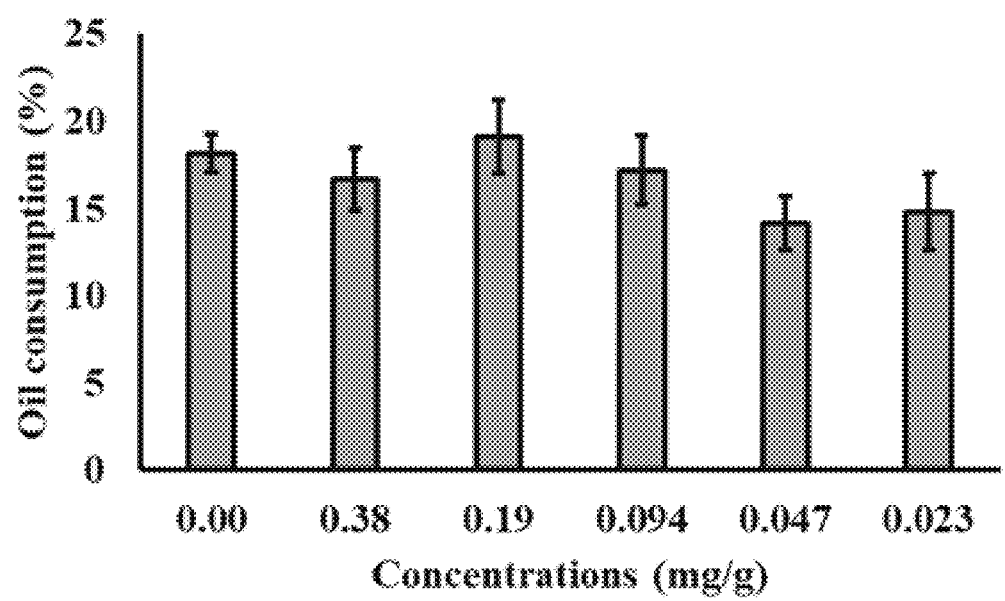
FIG. 27 depicts a graph of the fire ant consumption of soybean oil containing 0.00 mg/g; 0.38 mg/g; 0.19 mg/g; 0.94 mg/g; 0.047 mg/g; and 0.23 mg/g trans-2,4-heptadienal in multiple-choice bioassays.

To determine the preferred concentrations of trans, trans-2,4-heptadienal and 2-ethyl-3,6 (5)-dimethylpyrazine, the effect of different concentrations of these two compounds was evaluated using multiple-choice bioassays. The result for trans, trans-2,4-heptadienal is shown in FIG. 27. Mean oil consumption percentages (%) of each choice over the total oil consumption were used in one-way ANOVA analysis. This result shows that trans, trans-2,4-heptadienal did not significantly improve the feeding preference of fire ant on soybean oil at all tested concentrations (df=5, F=1.1, P=0.37). Since the oil consumption was numerically the highest at 0.19 mg/g, this concentration was selected for the comparative two-choice bioassay with 10-oxo-dodecanoic acid and 11-oxo-dodecanoic acid.

Figure 28:
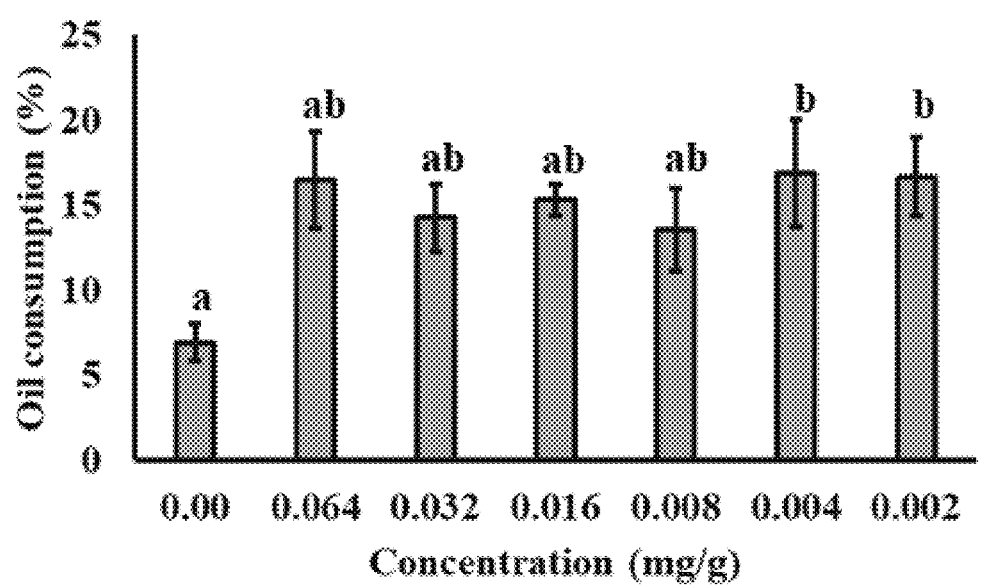
FIG. 28 depicts a graph of the fire ant consumption of soybean oil containing 0.00 mg/g; 0.064 mg/g; 0.032 mg/g; 0.016 mg/g; 0.008 mg/g; 0.004 mg/g; and 0.002 mg/g 2-ethyl-3,6 (5)-dimethylpyrazine in multiple-choice bioassays.

The result for 2-ethyl-3,6 (5)-dimethylpyrazine is shown in FIG. 28. Mean oil consumption percentages (%) of each choice over the total oil consumption were used in one-way ANOVA analysis. There was a significant difference among treatments and control (df=6, F=2.42, P=0.034). Means labeled with different letters are significantly different. This result shows that 2-ethyl-3,6 (5)-dimethylpyrazine significantly improved the feeding preference of fire ant on soybean oil at 0.002 and 0.004 mg/g. Since the oil consumption was numerically the highest at 0.004 mg/g, this concentration was selected for the comparative two-choice bioassays with 10-oxo-dodecanoic acid and 11-oxo-dodecanoic acid.

The following paired two-choice bioassays were conducted: 1) 10-oxo-dodecanoic acid at 1.14 mg/g vs trans, trans-2,4-heptadienal at 0.19 mg/g; 2) 11-oxo-dodecanoic acid at 1.08 mg/g vs trans, trans-2,4-heptadienal at 0.19 mg/g; 3) 10-oxo-dodecanoic acid at 1.14 mg/g vs 2-ethyl-3,6 (5)-dimethylpyrazine at 0.004 mg/g; 4) 11-oxo-dodecanoic acid at 1.08 mg/g vs 2-ethyl-3,6 (5)-dimethylpyrazine at 0.004 mg/g. The results are shown in Table 2 below, and FIG. 29A to FIG. 29D.

TABLE 2

Paired two choice bioassay results

| Bioassay | Compound | Mean oil consumption (mg) | SE | Paired t-test |
|---|---|---|---|---|
| 1 | 10-oxo-dodecanoic acid | 23.84 | 7.85 | DF = 7, t = −0.35, |
| 1 | trans, trans-2,4-heptadienal | 22.83 | 6.56 | P = 0.74 |
| 2 | 11-oxo-dodecanoic acid | 21.23 | 3.54 | DF = 7, t = −0.51, |
| 2 | trans, trans-2,4-heptadienal | 19.95 | 4.92 | P = 0.63 |
| 3 | 10-oxo-dodecanoic acid | 12.69 | 4.54 | DF = 7, t = −3.48, |
| 3 | 2-ethyl-3,6 (5)-dimethylpyrazine | 19.53 | 4.23 | P = 0.01 |
| 4 | 11-oxo-dodecanoic acid | 15.8 | 5.01 | DF = 7, t = −4.04, |
| 4 | 2-ethyl-3,6 (5)-dimethylpyrazine | 21.75 | 5.22 | P = 0.005 |

Figure 29A:
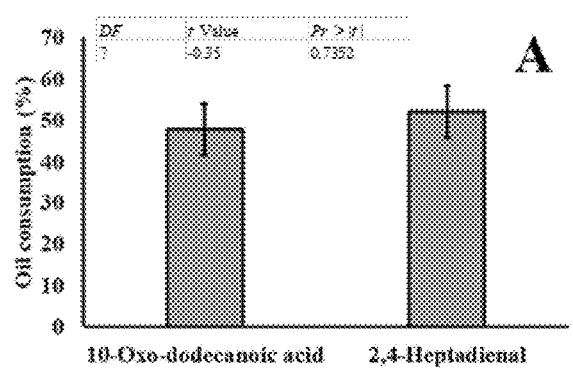
FIG. 29A to FIG. 29D depict graphs of the fire ant consumption of soybean oil containing 10-oxo-dodecanoic acid, 11-oxo-dodecanoic acid, or two known fire ant attractants in paired two-choice bioassays.
Figure 29B:
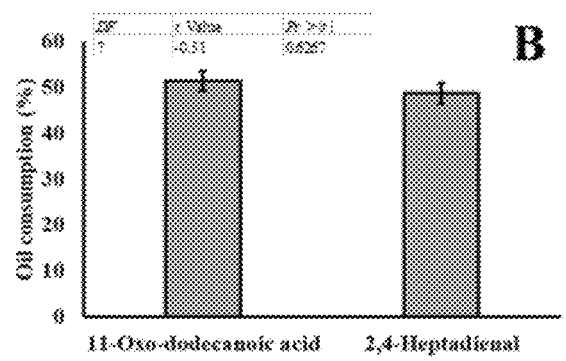
Figure 29C:
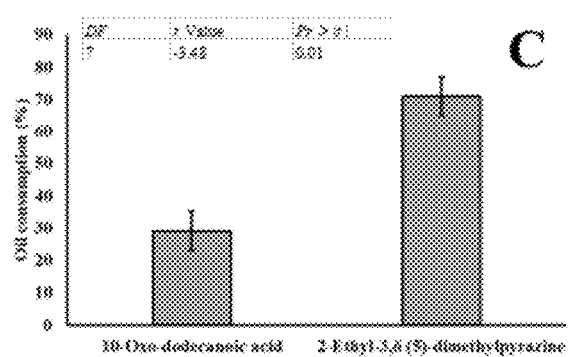
Figure 29D:
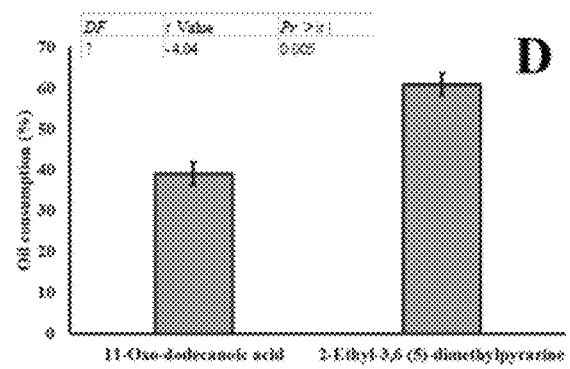

As seen in FIG. 29A, there was no significant difference in the effect on oil consumption between 10-oxo-dodecanoic acid at 1.14 mg/g and trans, trans-2,4-heptadienal at 0.19 mg/g (df=7, t=−0.35, P=0.74), and as seen in FIG. 29B, between 11-oxo-dodecanoic acid at 1.08 mg/g and trans, trans-2,4-heptadienal at 0.19 mg/g (df=7, t=−0.51, P=0.63). As seen in FIG. 29C, there was a significant difference in the effect on oil consumption between 10-oxo-dodecanoic acid at 1.14 mg/g and ethyl-3,6 (5)-dimethylpyrazine at 0.004 mg/g; (df=7, t=−3.48, P=0.01), and, as seen in FIG. 29D, between 11-oxo-dodecanoic acid at 1.08 mg/g and ethyl-3,6 (5)-dimethylpyrazine at 0.004 mg/g; (df=7, t=−4.04, P=0.005).

I claim:

1. A fire ant attracting composition comprising at least one fire ant food source, and at least one of 9-oxo-2-decenoic acid, 10-oxo-dodecanoic acid, 11-oxo-dodecanoic acid, or a mixture thereof, optionally a carrier, and optionally a fire ant insecticide wherein the composition is effective in attracting fire ants.

2. The composition of claim 1, wherein the fire ant food source is a vegetable oil.

3. The composition of claim 2, wherein the vegetable oil is canola oil, cottonseed oil, grapeseed oil, rapeseed oil, soybean oil, safflower oil, peanut oil, corn oil, olive oil, palm oil, or sunflower oil.

4. The composition of claim 3, wherein the vegetable oil is soybean oil.

5. The composition of claim 1, comprising an agronomically, a physiologically, or a pharmaceutically acceptable carrier.

6. The composition of claim 5, wherein the carrier is at least one of a mineral oil, a paraffin, a silicon oil, water, a membrane, a sachet, a disk, a rope, a vial, a tube, a septa, a resin, a hollow fiber, a microcapsule, a filter, a gel, a fiber, a natural polymer, a synthetic polymer, an elastomer, or a mixture thereof.

7. The composition of claim 5, wherein the carrier is at least one of an aqueous solution, a glycol, an alcohol, a ketone, an ester, a hydrocarbon, a halogenated hydrocarbon, a polyvinyl chloride, a clay, a laminate, a cellulosic matrix, a rubber matrix, a synthetic polymer matrix, or a mixture thereof.

8. The composition of claim 1, further comprising the fire ant insecticide.

9. The composition of claim 1, wherein the composition comprises 9-oxo-2-decenoic acid.

10. The composition of claim 1, wherein the composition comprises 10-oxo-dodecanoic acid.

11. The composition of claim 1, wherein the composition comprises 11-oxo-dodecanoic acid.

12. A method for attracting fire ants, said method comprising treating an object or area with a fire ant attracting effective amount of the composition of claim 1.

13. The method of claim 12, wherein the fire ant food source in the composition is a vegetable oil.

14. The method of claim 13, wherein the vegetable oil in the composition is canola oil, cottonseed oil, grapeseed oil, rapeseed oil, soybean oil, safflower oil, peanut oil, corn oil, olive oil, palm oil, or sunflower oil.

15. The method of claim 14, wherein the vegetable oil in the composition is soybean oil.

16. The method of claim 12, wherein the composition comprises an agronomically, a physiologically, or a pharmaceutically acceptable carrier.

17. The method of claim 16, wherein the composition comprises a carrier that is at least one of a mineral oil, a paraffin, a silicon oil, water, a membrane, a sachet, a disk, a rope, a vial, a tube, a septa, a resin, a hollow fiber, a microcapsule, a filter, a gel, a fiber, a natural polymer, a synthetic polymer, an elastomer, or a mixture thereof.

18. The method of claim 12, wherein the composition further comprises a fire ant insecticide.

19. The method of claim 12, wherein the composition comprises 9-oxo-2-decenoic acid.

20. The method of claim 12, wherein the composition comprises 10-oxo-dodecanoic acid.

21. The method of claim 12, wherein the composition comprises 11-oxo-dodecanoic acid.

22. A kit effective in attracting fire ants comprising at least one fire ant food source, and at least one of 10-oxo-dodecanoic acid, 11-oxo-dodecanoic acid, or a mixture thereof, optionally a carrier, and optionally a fire ant insecticide.

* * * * *